United States Patent [19]

Fisher

[11] Patent Number: 4,523,056
[45] Date of Patent: Jun. 11, 1985

[54] TELEPHONE INCLUDING RESISTIVE ARRAY FOR DIALING AND SYSTEM FOR USING SUCH TELEPHONE

[75] Inventor: Thomas M. Fisher, Plano, Tex.

[73] Assignee: Reliance Electric Company, Cleveland, Ohio

[21] Appl. No.: 453,292

[22] Filed: Dec. 27, 1982

[51] Int. Cl.³ .................................................. H04M 1/72
[52] U.S. Cl. ............................... 179/81 R; 179/90 K; 179/99 R
[58] Field of Search ................. 179/81 R, 84 T, 90 K, 179/99 A, 99 LC, 99 P, 99 R, 99 M

[56] References Cited

U.S. PATENT DOCUMENTS

| | | | |
|---|---|---|---|
| 3,665,112 | 5/1972 | Blake et al. | 179/99 R |
| 3,790,813 | 2/1974 | Ennis | 179/90 K X |
| 4,088,846 | 5/1978 | McEowen | 179/81 R X |
| 4,097,690 | 6/1978 | Kuntz et al. | |
| 4,196,317 | 4/1980 | Bartelink | 179/99 A X |
| 4,412,209 | 10/1983 | Frame et al. | 179/90 K X |
| 4,459,434 | 7/1984 | Benning et al. | 179/84 T X |

FOREIGN PATENT DOCUMENTS 3036800 8/1982 Fed. Rep. of Germany.
2095512 9/1982 United Kingdom.

Primary Examiner—Keith E. George
Attorney, Agent, or Firm—Michael M. Rickin

[57] ABSTRACT

A system for providing telephone service to a subscriber. The system has at least one unconventional telephone and at least one master or interface unit which is electrically connected between the telephone and the central office. The operation of the telephone hook switch in combination with the operation of the dialing information entering means on the telephone provides changes in the impedance of the telephone. The master unit responds to these impedance changes to generate signals interpretable as dialing to the central office. When the telephone is on-hook the master unit responds to ringing from the C.O. and converts that signal to a signal which is used by the telephone to alert the subscriber.

29 Claims, 9 Drawing Figures

TELEPHONE INCLUDING RESISTIVE ARRAY FOR DIALING AND SYSTEM FOR USING SUCH TELEPHONE

BACKGROUND OF THE INVENTION

1. Field of the Invention

This invention relates to telephone systems and more particularly to a system which utilizes the combination of one or more unconventional minimum component handsets and one or more master units to provide at least standard telephone service.

2. Description of the Prior Art

Since conception, the telephone instrument has provided a basic means of conducting voice communications between two or more parties. The generic instrument serves the functions of converting destination information into electrical signals for call routing (dialing), alerting the user to incoming calls (ringing) and providing voice communications by converting electrical into acoustical signals and vice versa.

As time has passed, the role of the telephone instrument has taken on new dimensions, many of which have resulted in added circuit complexity. This is especially true when the instrument is used as an integral part of a telephone system but also analog to digital electrical signal conversion.

Today, there are numerous small telephone systems in the form of private automatic branch exchanges (PABX) and key telephone sysems (KTS) that offer enhanced servies to their users. These small systems generally comprise an electronics package sometimes referred to as the common equipment to which all of the telephones in the system have access. A feature common to all of these systems is the use therein of telephone instruments which are no less complex than the conventional standard instrument. A conventional standard tone system telephone includes a transmitter, a receiver, a switch hook, a bell ringer, a tone keypad with tone generating means and a hybrid circuit. In many cases, these systems also involve the use of instruments which are substantially more complex than the conventional standard instruments. These instruments include additional elements generally in the form of electronics to provide functions such as call forwarding, repertory dialing, etc.

It was then recognized that a system serving a multiplicity of telephones could be provided wherein functions common to all of the systems' telephone instruments such as ringing and dialing could be placed in a master unit to which all of the instruments have access. This placement of the common functions in a master unit then allows the conventional standard telephone to be replaced with a handset which is substantially less complex and costly than even the conventional instrument. This new, less costly and relatively simple instrument will be referred to hereinafter as the "unconventional telephone". It was also recognized that such a system could provide a multitude of enhanced subscriber services (some of which are described above) without the necessity of using even more complex instruments. A simple expansion of the capability of the master unit will allow one or more of those enhanced services to be provided to all of the systems inconventional telephones.

It was further recognized that such a system could be configured in a form useful for single line applications or in a form similar to present key telephone systems. It was even further recognized that the system for single line applications could be designed in a manner such that those subscribers having station wiring with at least four conductors could use their already in place conventional telephones in conjunction with the system of the present invention. This feature allows such a subscriber to have access to enhanced services without having to do anything more than connect the system of the present invention to his station wiring.

SUMMARY OF THE INVENTION

According to the present invention, there is disclosed a telephone system for providing service between a subscriber and a central office which comprises at least one unconventional telephone, that is a telephone set adapted for use in the system and at least one unit for interfacing the telephone with the central office.

The telephone includes at least a receiver for converting electrical signals into acoustical signals, a transmitter for converting acoustical signals into electrical signals, an information entering unit and a switching device. The switching device has one position when the telephone is on-hook and another position when the telephone is off-hook. Each position of the switch provides the telephone with non-reactive impedances in a predetermined manner.

The information entering unit provides the telephone with a multiplicity of unique non-reactive impedances in response to the entry by the subscriber when the telephone is off-hook of a respective one of a multiplicity of discrete pieces of information.

The interface unit is electrically connected between the central office and the telephone and receives electrical information signals including ringing from the central office and electrical signals from the telephone. The interface unit includes means which responds to the ringing signal and the on-hook non-reactive impedance for generating an alerting signal. Also included are means responsive to the unique non-reactive impedances and the off-hook non-reactive impedance to generate central office interpretable dialing signals.

The interface unit transmits the dialing interpretable signals to the central office. It transmits the electrical information signals received from the central office to the telephone when it is off-hook and the alerting signal to the telephone when it is on-hook. The telephone responds to the alerting signal to alert the subscriber.

DESCRIPTION OF THE DRAWING

FIG. 1b is a block-schematic diagram of the master unit shown in FIG. 1a.

DESCRIPTION OF THE PREFERRED EMBODIMENT

Figure 1A:
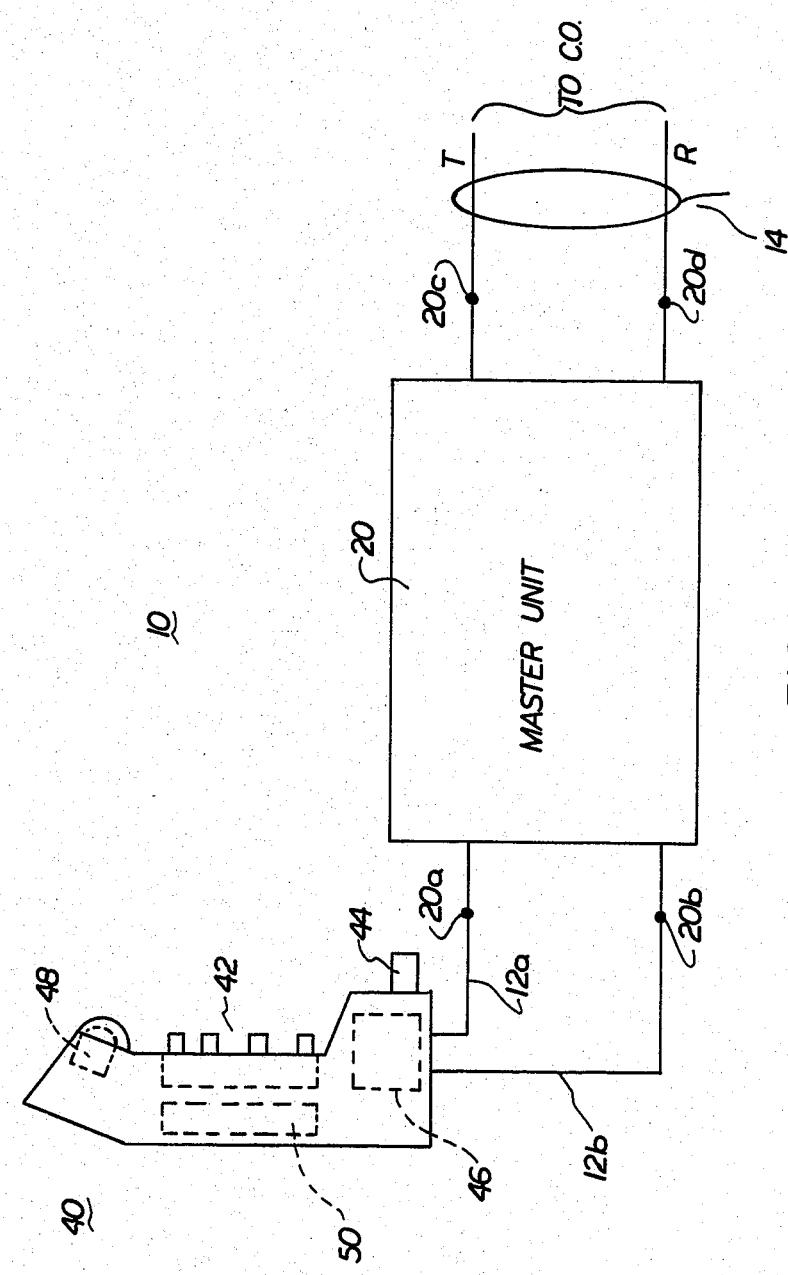
FIG. 1a is a block diagram of a single line application of the master unit and unconventional telephone according to one aspect of the present invention.
Figure 1B:
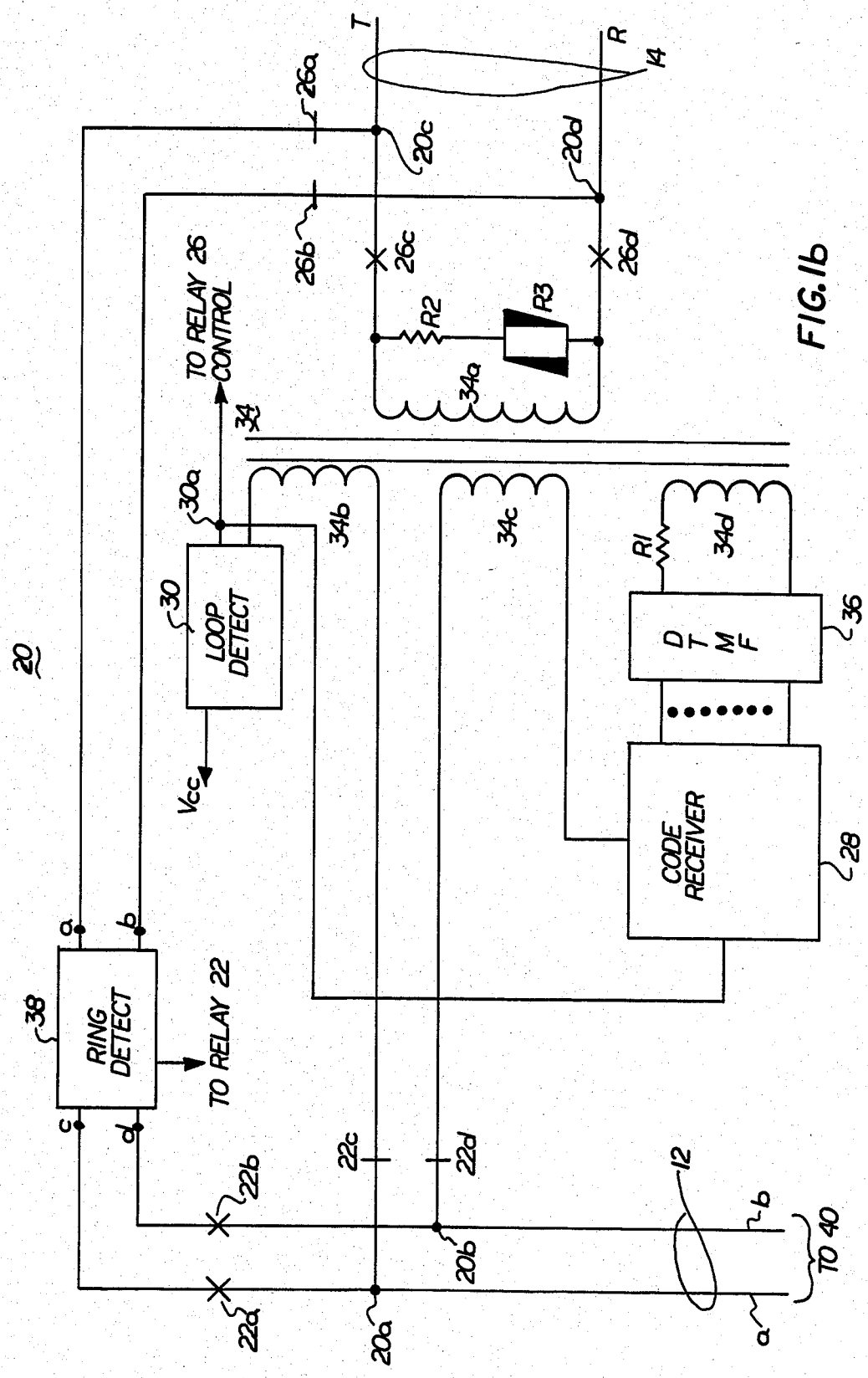

In FIGS. 1a and 1b there is shown a system 10 constructed in accordance with the present invention for use in single line applications. In its simplest form this embodiment of system 10 includes a single master station or unit 20 and a single unconventional telephone set 40 of the type to be described hereinafter. It is this embodiment of the system which is illustrated in essentially block diagram form in FIGS. 1a and 1b. FIG. 1a shows only a block for the master unit 20, as well as blocks for the various circuits which comprise telephone 40.

Figure 2:
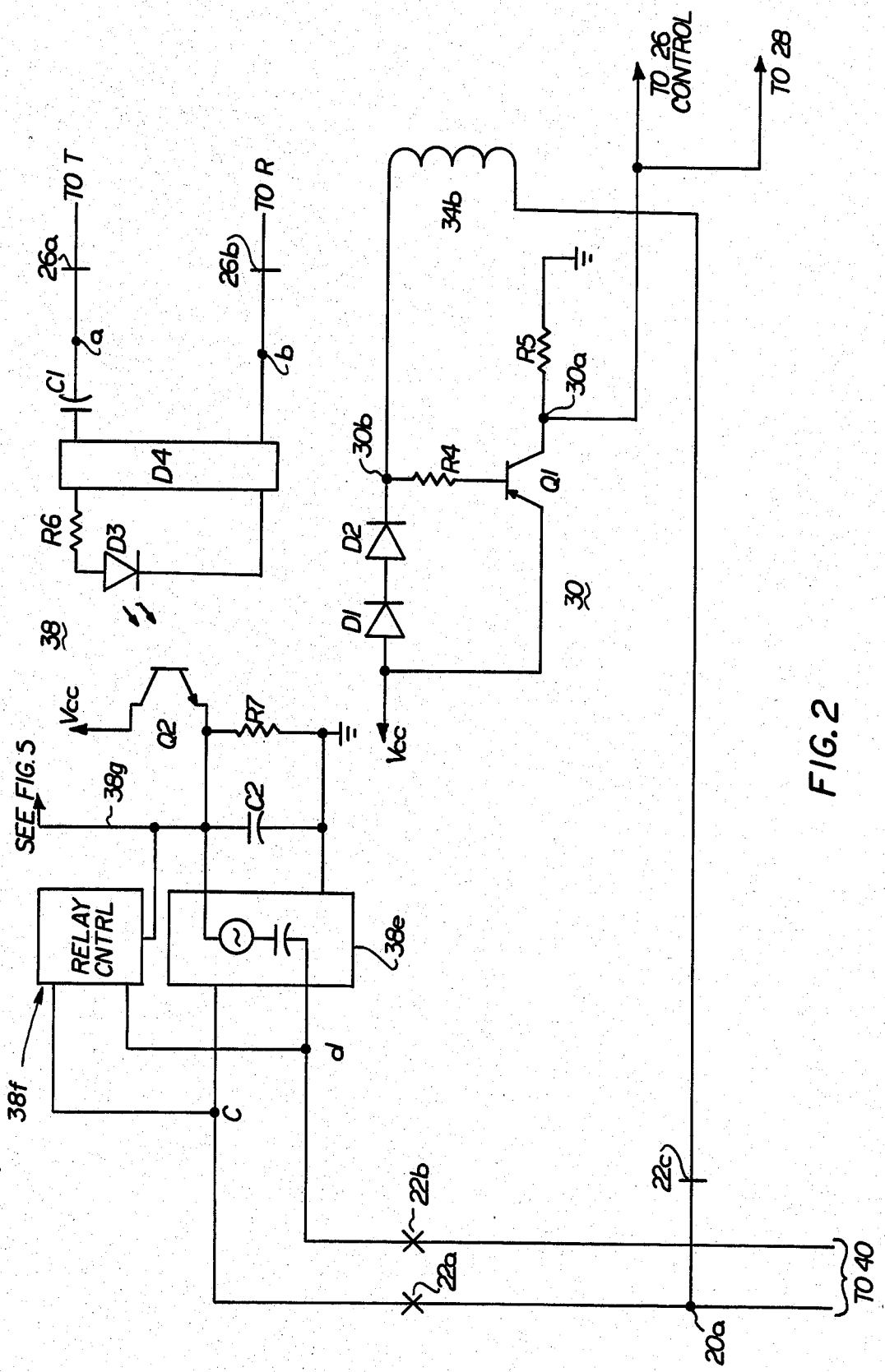
FIG. 2 is a schematic diagram of the loop and ring detect circuits of the master unit.
Figure 3:
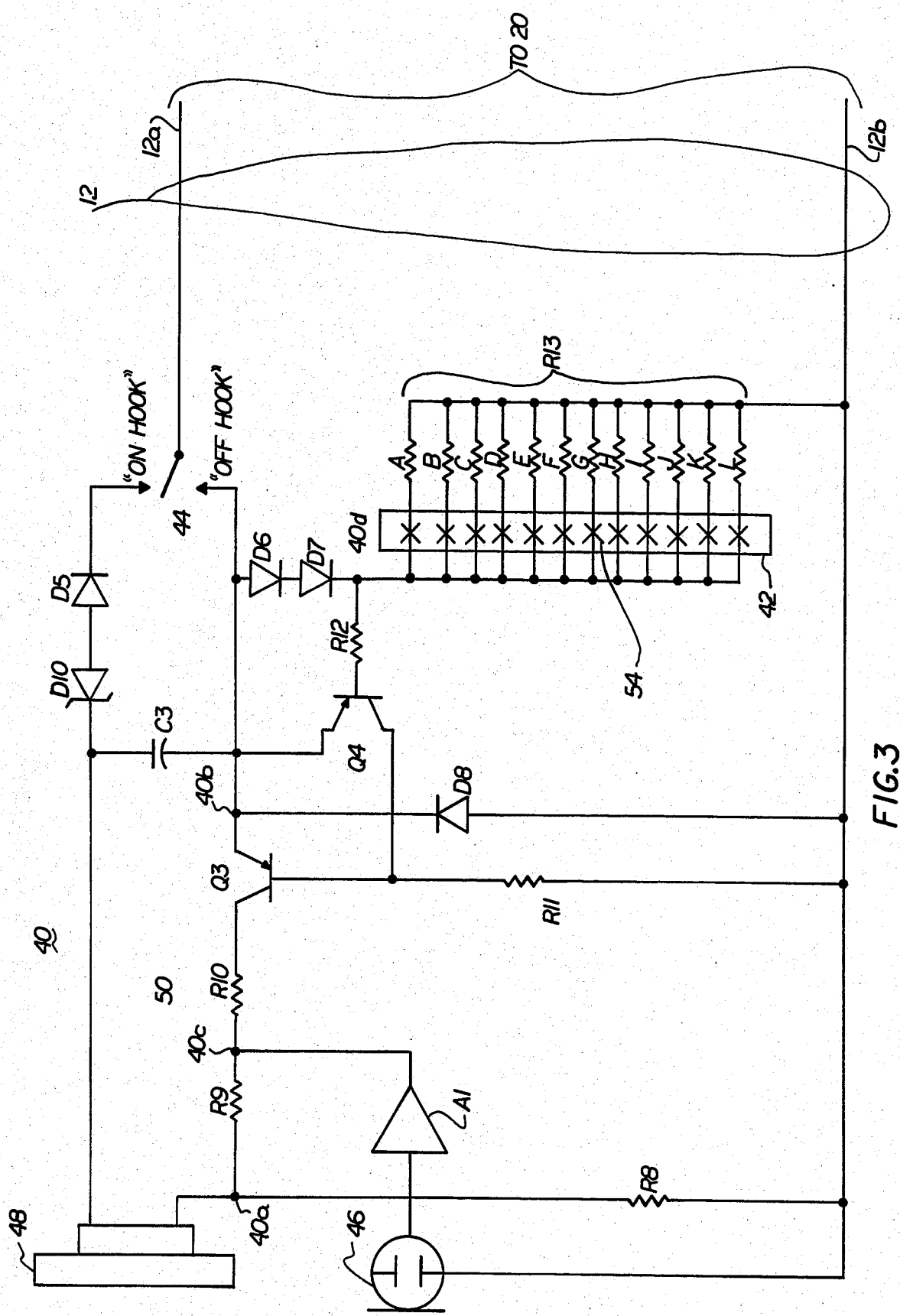
FIG. 3 is a schematic diagram of the unconventional telephone of FIG. 1a and includes a schematic diagram for the keyboard of the telephone according to another aspect of the present invention.
Figure 4:
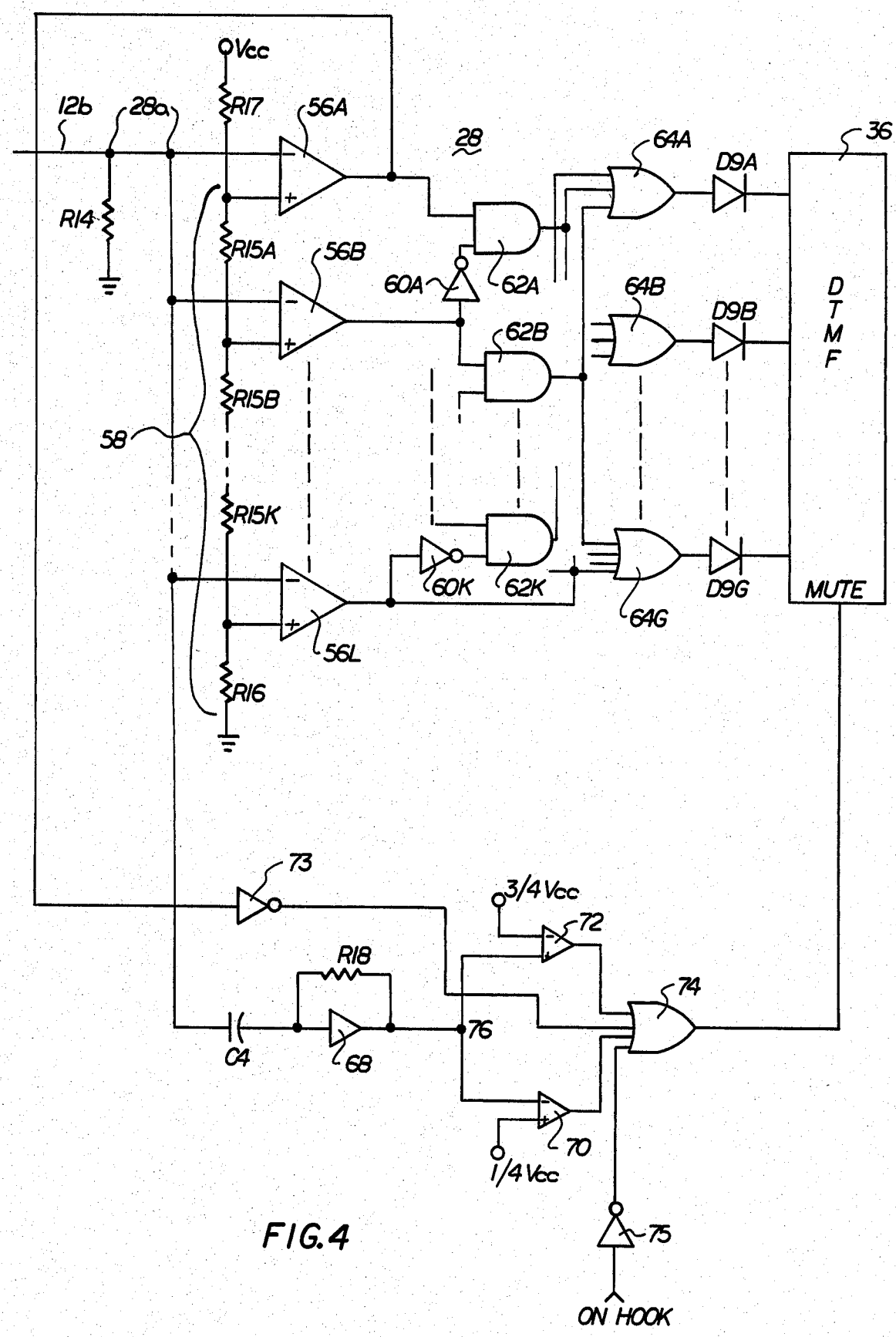
FIG. 4 is a schematic diagram for the code receiver portion of the master unit.

FIG. 1b shows in essentially block diagram the various major circuits which comprise master unit 20. Detailed circuit schematics for various ones of the master unit circuits are shown in FIGS. 2 and 4 while detailed circuit schematics for those unconventional circuit parts of telephone 40 are shown in FIG. 3.

The operation of system 10 will first be described in general in connection with FIGS. 1a and 1b. Thereafter the specific circuits shown in FIGS. 2, 3 and 4 for master unit 20 and telephone set 40 will be described. Finally, the operation of system 10 will be described in connection with both a call originated by a system user or subscriber from telephone 40 and a call to the subscriber which has its origin outside of the system.

Referring now to FIG. 1a, master unit 20 provides the interconnection or interfacing between the unconventional telephone set 40 (the term unconventional meaning a telephone set adapted for use in the system) and the telephone company central office (C.O.) equipment (not shown). The interconnection between the master unit and the telephone set is provided by the pair of conductors designated as 12a and 12b. The telephone set may be located at a considerable distance from the master unit. It has been found that conductors 12a and 12b may extend upwards of 1,000 feet (about 300 meters) from the master unit without noticeable deterioration in system performance. The interconnection between the master unit and the C.O. is provided by the pair of conductors carrying the numerical designation 14. As this pair is the same as that which connects a user of conventional telephone service to the C.O., these conductors therefore also carry the well-known designations tip (T) and ring (R). Typically, master unit 20 is located at the subscriber location.

In the case of the single line application of system 10 being described herein, the present invention may be able to coexist without any modification with any standard telephone sets present at the subscriber's location. The single line application for the present invention is typically in a subscriber's residence although it may also be applicable to those small commercial establishments which do not have multiple lines connecting them to the C.O. If the site wherein system 10 is located has station wiring consisting of four conductors, two of which are not committed, then system 10 can without modification coexist with any standard telephone sets, that is telephone sets capable of being directly connected to the central office, at that site. In that case all communications between unit 20 and telephone 40 are carried over the two uncommitted conductors 12a, 12b independent of the normal tip and ring conductors 14 connecting the conventional telephones to the C.O.

While not shown in FIG. 1a the one or more conventional (or standard as the term is described above) telephones are each connected to the tip and ring conductors at some point to the right of the terminals designated as 20c and 20d of unit 20. Also while FIG. 1a has shown only a single unconventional telephone, it should be appreciated that system 10 may include one or more such unconventional telephones. In the single line application being described herein, all of the unconventional telephones would be connected to the conductors 12a and 12b and therefore to the single master unit 20 at some point to the left of the terminals designated at 20a and 20b. In the telephone industry the four conductor station wiring usually has a unique color associated with each of the conductors. The tip and ring conductors are usually colored red and green, respectively, whereas the conductors 12a and 12b are usually colored black and yellow. Thus, one or more conventional telephones at terminals 20c and 20d of unit 20 are connected to the red and green conductors whereas the one or more unconventional telphones as well as terminals 20a and 20b of unit 20 are connected to the black and yellow conductors.

Telephone 40 includes a hookswitch 44, condenser transmitter 46 and standard dynamic receiver 48. Also included in telephone 40 are a mechanical keyboard 42 arranged in the well-known four row and three column configuration. Therefore, keyboard 42 has twelve keys in total, ten of which are associated with a respective one of the digits 0 through 9 with the remaining two keys associated with the asterisk (*) and the octalthorpe (#). Finally, telephone 40 includes a hybrid speech network, a microphone amplifier and an electronic switch which in combination, together with the code generating resistors that will be described in more detail in connection with FIG. 3, form electronic circuit 50.

Referring to FIG. 1b there is shown an essentially block diagram for the major circuits included in master unit 20. The master unit includes code receiver 28, loop detector 30, dual tone multifrequency (DTMF) generator 36 and ring detector 38. All of these circuits provide signaling, ringing, receiver, and transmitting functions and are included in the master unit as they are not essential for the operation of telephone set 40. As will be described in more detail hereinafter, it is the concentration of these circuits in the master unit which allows system 10 to provide enhanced subscriber service and also include at least one unconventional telephone set 40. Also included in master unit 20 are ringing relay 22 and line relay 26.

Ringing relay 22 has the normally open (N.O.) contacts shown as 22a and 22b which are operated in response to the detection by circuit 38 of a ringing signal transmitted to the master unit from the C.O. to thereby connect telephone 40 to receive that signal over conductors 12a and 12b. Simultaneously the normally closed (N.C.) contacts designated as 22c and 22d of the relay are operated to disconnect the telephone set 40 from the remainder of the master unit circuitry. The relay contacts are operated when circuit 38 provides, upon detection of a ringing signal, a signal to operate relay 22. The contacts of relay 22 are returned to their normally unoperated condition when the subscriber answers the ringing telephone. It is the activation of the hookswitch 44 in telephone set 40 which causes ringing detect circuit 38 to generate a signal to operate relay 22 which allows the contacts of that relay to return to their unoperated condition. While not shown in FIG. 1b the control for relay 22 is included in circuit 38 and is conventional in nature. The control provides the signal to either energize or de-energize the relay in response to the detection by circuit 38 of a ringing signal. Thus, when in response to the ringing signal telephone 40 goes "off hook", the contacts of relay 22 return to their unoperated condition.

Line relay 26 having the N.C. contacts designated as 26a and 26b and the N.O. contacts designated as 26c and 26d is operated only after the subscriber has activated the hookswitch in telephone set 40. Placing telephone set 40 on-hook allows the contacts of relay 26 to return to their unoperated condition. As can be seen from FIG. 1b, it is the operation of relay 26 which establishes in conjunction with transformer 34 the communication path between the telephone set 40 and the T and R conductors. Thus, where the subscriber is originating a call, it is the going off-hook of the unconventional telephone set which allows this connection to take place, whereas when the subscriber is receiving a call it is the going off-hook in response to the ringing of unconventional telephone 40 which allows the connection to be made.

Also included in unit 20 is a transformer 34 which has a primary winding designated as 34a and the three secondary windings designated as 34b, 34c, 34d, respectively. Code receiver 28 is connected to terminal 20b of unit 20 by the series combination of winding 34c and N.C. contact 22d of relay 22. Conductor 12b and N.O. contact 22b of the relay are also connected to terminal 20b. Code receiver 28 functions to sense the activation of the hookswitch in telephone set 40 when the subscriber is originating a call and also to decode on a key-by-key basis the key which the subscriber has depressed on the keyboard 42 during dialing.

When code receiver 28 performs its function of sensing the activation of the hookswitch by the subscriber, it generates a signal to the DTMF generator circuit 36. This signal inhibits the operation of circuit 36 to thereby prevent the generation of a pair of tones when the hookswitch is activated. Circuit 36 does, however, generate a unique tone pair for each key which is depressed on keyboard 42 when telephone 40 is off-hook. When code receiver 28 performs its other function of decoding on a key-by-key basis the pressing of the keyboard by the subscriber, it provides input signals to DTMF circuit 36. The off-hook inhibit signal is removed whenever a key is depressed. These input signals allows circuit 36 to generate the tone signals corresponding to each of the keys being depressed. The output of circuit 36 is connected directly to one end of winding 34d and by a resistor R1 to the other end of the winding.

Loop detector 30 is connected to terminal 20a by the series combination of winding 34b and the N.C. contact 22c of relay 22. The loop detector is also connected at the terminal designated as 30a to the code receiver. When telephone 40 goes off-hook, circuit 30 generates a terminal 30a a signal to the code receiver indicative thereof. Also, circuit 30 generates a signal to the conventional control for relay 26 (not shown) to thereby cause that relay to operate. The control for relay 26 is connected to circuit 30 at terminal 30a. The going "off-hook" of telephone set 40, whether in response to a ringing signal or as a result of a subscriber originated cell, causes loop detector 30 to be connected through transformer winding 34b to conductor 12a and therefore to telephone set 40. Loop detector 30 then functions to monitor the off-hook condition of telephone set 40. Upon the going on-hook of set 40, loop detector 30 causes relay 26 to be returned to its unoperated state.

Ring detector circuit 38 has its input terminals 38a and 38b connected, respectively, by N.C. contacts 26a and 26b of relay 26 to terminals 20c and 20d of circuit 20. These connections allow terminal 38a to be connected to the T conductor of pair 14 and terminal 38b to be connected to the R conductor of that pair when relay 26 is in its unoperated state. The output terminals 38c and 38d of circuit 38 are connected, respectively, by N.O. contacts 22a and 22b of relay 22 to terminals 20a and 20b of circuit 20. These connections allow the ringing signal to be transmitted in a manner to be described in connection with FIG. 2 to telephone set 40 when relay 22 is operated by circuit 38 in response to a ringing signal received at the unit 20 from the C.O.

Transformer primary winding 34a is connected by N.O. contacts 26c and 26d of relay 26 to the terminals 20c and 20d. Therefore, the primary winding is connected to the T and R conductors when telephone set 40 is off-hook. The series combination of a resistor R2 and a varistor R3 connected n parallel across winding 34a limits the voltage across transformer 34.

Referring to FIG. 2 there are shown typical embodiments for loop detector 30 and ring detect 38 of unit 20. Also shown in FIG. 2 are those other portions of unit 20 which interconnect with circuits 30 and 38.

Loop detect circuit 30 includes the series combination of the two diodes D1, D2, poled as shown. The anode of the diode D1 connects to a positive supply voltage Vcc and the cathode of D2 connects at the junction designated as 30b to the base of PNP transistor Q1 through current limiting resistor R4. The junction 30b is also connected to one end of secondary winding 34b. The collector of Q1 is connected at the terminal 30a to system ground by a resistor R5, to the control for relay 26 and to code receiver 28. The emitter of Q1 is connected to Vcc.

When telephone set 40 is on-hook, no current flows through D1 and D2. Therefore, the voltage at the base of Q1 is Vcc and equal to the emitter voltage. Q1 is turned off and the voltage at the terminal 30a is at ground potential. When the subscriber is off-hook, current flows primarily through D1 and D2, winding 34b, N.C. contacts 22c, through the telephone 40 via conductors 12a, 12b, N.C. contact 22d, winding 34c and is returned to ground inside the code receiver 28. The current through the D1, D2 combination creates a voltage at the base of Q1 which is sufficient to bias the transistor. The collector of Q1 therefore rises to within the transistor saturation voltage of Vcc. This high output state of Q1 is applied to the control for relay 26 and to code receiver 28 which are both connected to terminal 30a to thereby cause the relay to operate and to indicate the off-hook to the code receiver.

Ring detect 38 includes the series combination of a capacitor C1, a resistor R6, and a photo diode D3 (poled as shown) connected by the N.C. contacts 26a and 26b of relay 26 between the T and R conductors, respectively. The end of capacitor C1 not connected to R6 is connected to relay contact 26a. A diode bridge, designated collectively as D4, is connected between R6, C1, the cathode of diode D3 and terminal 38b as shown. Incoming calls for the subscriber of system 10 are alerted by an alternating ringing voltage which is placed on conductor 14 by the C.O. Line relay 26 connects this voltage to photo diode D3. Diode D4 protects D3 from reverse breakdown during negative swings of the alternating ringing voltage. The two diodes cause half wave rectification of the ringing signal.

The light generated by diode D3 in response to the C.O. ringing voltage is received by NPN photo transistor Q2 at its base. The collector of Q2 is connected to a source of positive voltage +Vcc and the emitter is connected to one end of the parallel combination of a resistor R7 and a capacitor C2. The other end of the parallel combination is connected to ground. In response to the light received at its base, Q2 generates a d-c signal at its emitter as a result of the filtering action of the capacitor C2.

Circuit 38 also includes internal oscillator 38e and ringing relay control 38f. Oscillator 38e is directly connected to the emitter of Q2 at the terminal 38g and is AC coupled to the N.O. relay contact 22b by an internal capacitor. The d-c signal generated at the emitter of Q2 turns on the oscillator which generates a frequency modulated warble tone. The tone is used to "ring" telephone set 40. The C.O. generated a-c ringing voltage detected by circuit 38 is typically in the order of 105 volts at a frequency of 20 Hz. The warble tone generated by oscillator 38e in a low voltage, high frequency signal typically in the order of 700 millivolts RMS at 1000 HZ which is modulated at the 20 Hz frequency of the C.O. ringing signal. This signal is superimposed on the system voltage and is interrupted in synchronism with the interruptions by the C.O. of its ringing signal.

Relay control 38f has its input connected to terminal 38g and its outputs connected across terminals 38c and 38d of circuit 38. In response to the d-c signal at the emitter of Q2 control 38f causes the ringing relay 22 to be operated. Operation of the ringing relay disconnects the telephone set from the code receiver and the loop detector and allows the warble tone generated by oscillator 38e to be applied to the receiver 48 of telephone set 40. This produces the acoustical alerting of an incoming call to the subscriber. The d-c signal at terminal 38g which is indicative of a deleted ringing signal is also connected to the equipment used when the present invention is configured in the multiline system shown in FIGS. 5 et seq. to be described hereinafter.

When the subscriber causes set 40 to go off-hook in response to the ringing signal, a d-c path is placed across conductors 12a and 12b. The d-c current flowing therein is sensed by circuit 38f which produces a control signal which allows ringing relay 22 to be returned to its normal state thereby disconnecting the warble tone from the telephone set and reconnecting the telephone set to loop detector 30. Circuit 30 detects the off-hook condition of the telephone set 40 and generates a signal to operate relay 26 thereby connecting set 40 to the T and R conductors 14 through transformer 34 and disconnecting the C.O. ringing signal from circuit 38. Upon sensing this connection, the C.O. equipment removes the ringing signal from conductors 14.

Referring to FIG. 3 there is shown an embodiment for unconventional telephone set 40. Set 40 accomodates voice communications by the use of amplified condenser transmitter 46, dynamic receiver 48 and electronic circuit 50. Circuit 50 includes a hybrid speech network, a microphone amplifier and an electronic switch each of which are described in more detail hereinafter.

Hookswitch 44 is shown in FIG. 3 in the on-hook state. With the switch on-hook, set 40 is able to receive the audible warble tone which, as was previously described, is generated by ringing detector 38 in response to a ringing signal from the C.O. This warble tone signal is received by telephone set 40 from the master unit 20 on the conductor 12b of pair 12 and is returned to that unit on conductor 12a. With telephone 40 on hook, the positive d-c component in the ringing signal is supplied to conductor 12b. The positive ringing warble tone is applied to receiver 48 through a resistor R8. The d-c component of the signal appears at the cathode of a zener diode D10 which is connected to receiver 48 and is sufficiently positive to cause D10 to conduct. Diode D5, which is in series with diode D10 and has its anode connected to the anode of D4 and its cathode connected to the on-hook position of switch 44, ordinarily blocks signals to the receiver whenever the telephone or another instrument operating in parallel is off-hook. The d-c component of the ringing signal forward biases D5 and current is allowed to flow through the hookswitch, conductor 12a and to ground within the ringing detect circuit 38.

The establishment of the d-c current path permits conduction of the warble tone generated by oscillator 38e to the receiver 48 of telephone 40. Because the a-c impedance of conducting diodes D10 and D5 is low, most of the warble tone appears across resistor R8 and receiver 48. In response thereto, the receiver provides an audible output of sufficient level to alert the user to the incoming call.

Lifting of the instrument by the user activates the hookswitch 44 which changes from the on-hook to the off-hook contact. This change places a diode D8 whose cathode is connected to the off-hook contact and whose anode is connected to conductor 12b directly across conductors 12a and 12b. Diode D8 conducts maximum current when conductor 12b is more positive than 12a as is the case during ringing. The connection of D8 causes the voltage on conductor 12a to rise from the reduced voltage created by the presence of zener diode D10 to a level very nearly that of the voltage of conductor 12b. A level detection circuit (not shown) in relay control circuit 38f senses the d-c voltage change on conductor 12a through the operated contacts 22a of relay 22. In response thereto ring detect circuit 38 returns the contacts of relay 22 to their normally unoperated condition. The return of relay 22 to its unoperated condition allows loop detect circuit 30 to sense the off-hook condition of instrument 40 and, in turn, causes relay 26 to operate. In this manner, the warble tone is terminated and the C.O. is alerted to terminate its ringing signal.

When system 10 is in an idle state, that is, no call is in progress, master unit 20 maintains a positive system voltage, Vcc, on conductor 12a. This voltage may, for example, be obtained by the use in system 10 of a power supply (not shown) which derives that voltage from the local a-c voltage.

Telephone set 40 includes a transistor Q3. The transistor has its base connected to conductor 12b by a resistor R11, its collector connected to the junction 40a by the series combination of resistor R9 and R10 and its emitter connected to the off-hook contact of switch 44. Junction 40a is also, by the resistor R8 whose function was described above, connected to conductor 12b. The emitter of Q3 is also connected by the diode D8 to conductor 12b. Finally, the base and emitter of Q3 are also connected to the collector and emitter of a transistor Q4 whose function will be described hereinafter.

When the user originates a call, the activation of the hookswitch 44 to the off-hook position places a positive voltage very nearly equal to Vcc on the emitter of transistor Q3. As will be shown and described hereinafter in connection with FIG. 4, master unit 20 returns conductor 12b to ground. Therefore, as 12a is more positive than 12b, d-c current flows through the emitter-base junction of Q3, through resistor R11, to ground in the code receiver of the master unit 20 via conductor 12b. The base current in Q3 turns the transistor on placing the combination of resistors R8, R9 and R10 across conductors 12. Q3, therefore, acts as an electronic switch. Resistors R8, R9 and R10 serve as a resistive hybrid, performing the function of proportioning the amplitude of transmitted and received signals between the microphone 46 and receiver 48.

The resistance values of R8, R9 and R10 are selected so that the desired levels of hybrid conversion are achieved and so that the impedance presented across terminals 12a and 12b equals that of the two secondary windings 34b, 34c of transformer 34, that is, approximately 600 ohms. Current flow through the resistive hybrid is sensed by loop detect circuit 30 as an off-hook condition.

Amplifier A1 has its input connected to the output of condenser microphone 46 and its output connected to the junction designated as 40c. A1 amplifies the output of the microphone to a level which is consistent with the normal transmission level of a conventional telephone. A capacitor C3 has one end connected to dynamic receiver 48 and its other end connected to junction 40b. The capacitor dynamically couples the voice signal which appears on conductors 12a and 12b to the instrument 40 while blocking the flow of d.c. current so as not to shunt current away from the amplifier.

Also included in telephone set 40 is keyboard 42 which, as described previously, has twelve keys arranged on the face of the set in four rows and three columns. These keys are shown symbolically in FIG. 3 in the form of twelve N.O. contacts designated in total as 54. In the set the contacts or keys 54 are arranged in a 1-by-12 single pole, single throw configuration. Associated with a respective one of each of the keys is one of the resistors designated as A through L, respectively, in the resistor array designated as a whole by R13.

Transistor Q4 is connected with its emitter in common with the emitter of Q3 and its collector to the base of Q3. The base of Q4 is returned to its emitter through the series combination of resistor R12 and diodes D6 and D7. The junction 40d of diode D7 cathode and resistor R12 is also connected to the common side of keyboard 42. When telephone set 40 is off-hook and no key 54 is depressed, transistor Q4 is off since its base and emitter voltages are equal. However, when any one of the keys is depressed, the current path created by the series connection of D6, D7 and the respective one of the resistors R13 A through L corresponding to the depressed key, between conductors 12a and 12b, forward biases the emitter base junction of Q4, causing Q4 to turn on. The low collector-emitter voltage of Q4, in an on state, shunts current away from the base-emitter of Q3 causing that transistor to turn off. This action removes the low impedance path of the resistive hybrid. Therefore, whenever a key is depressed, the switching action of Q4 and Q3 causes a change in loop current that is unique to the key being depressed. As will be described in more detail in connection with FIG. 4, it is that current created by a resistor selected by depressing a key in the unconventional telephone 40 in combination with a resistor in the code receiver 28 that results in a unique voltage in the master unit for decoding the key depressed by the master unit.

In summary when the user originates a telephone call, the change in position of the hook switch provides a change in the impedance of the telephone from open-circuit for on-hook to about 600 ohms for off-hook. When the user presses one of the keys on the keyboard to thereby select one of the resistors R13 the impedance of the telephone changes from that presented at off-hook. The amount by which that impedance changes is dependent on the particular one of the resistors selected. Each resistor provides a unique impedance which in combination with the off-hook impedance presents to master unit 20 an impedance for the telephone which changes as different keys are depressed.

Referring to FIG. 4, there is shown a schematic circuit diagram for code receiver 28 of the master unit 20. Also shown is DTMF generator 36. The code receiver is connected to the telephone set 40 by relay 22 whenever ringing voltage is present on C.O. line 14.

During dialing when the user presses a selected one of the keys 54 of the telephone set, the associated one of resistors R13 is connected across the line 12 as previously described. This resistor in combination with precision resistor R14 of code receiver 28 forms a voltage divider network to thereby generate from Vcc twelve unique voltage levels. A thirteenth level also exists. That level is generated when the instrument is off-hook and no key is depressed. The code receiver output under that condition is used to mute the tone generator. This muting prevents the generation of any tones by generator 36 solely as a result of telephone 40 being off-hook.

Code receiver 28 includes twelve operational amplifiers functioning as voltage comparators designated at FIG. 4 as 56A through 56L. These comparators are used to decode which one of the twelve keys has been depressed.

The unique voltage at terminal 28a appears at the inverting input of each one of comparators 56A through 56L. The noninverting input of each of the comparators 56A through 56L is connected to a reference voltage that is derived from a resistor divider chain 58. The chain includes eleven resistors R15A through R15K, each having equal values of resistance. These resistors are connected to comparators 56A through 56L in a manner such that one of the resistors is connected between each successive noninverting input. Thus, resistor R15A is connected between the noninverting inputs of comparators 56A and 56B and resistor R15B is connected between the noninverting inputs of 56B and 56C (not shown) and so on with R15K being connected between the inverting inputs of 56K (not shown) and 56L.

Resistor chain 58 also includes a low threshold resistor R16. The resistance of this resistor is one and one-half times the value of the resistances of each of the multiple resistors R15A through R15K. The resistor R16 is connected between the noninverting input of comparator 56L and ground.

Finally, chain 58 includes a supply resistor R17 having one end connected to the supply voltage Vcc and the other end connected to the noninverting input of comparator 56A. Resistor R17 sets the top threshold voltage whereas R16 sets the low threshold voltage. This arrangement of resistors results in the comparators 56A through 56L being set at 12 equally spaced voltage levels each of which are in the center of a window having equally spaced upper and lower thresholds. The lower threshold of one window being the upper threshold of the window associated with the next lower voltage level. While equal spacing of voltage levels is described here, it may be desirable in certain cases to expand the upper windows and compress the lower ones. This compression and expansion provides properly weighted compensation for accumulative errors in the resistors R13 of telephone set 40 and also compensates for the effects of non-ideal circuit parameters.

When the user presses a selected one of the keys 54, the low resistance of the series combination of R8, R9 and R10 is replaced by the higher value resistance R13. The combination of Vcc, the voltage drop across D6, D7, R13 and R14, therefore, produces a voltage whose amplitude at terminal 28a is dependent on the particular one of the 12 keys which has been depressed. This key dependent voltage has an amplitude which falls below the upper threshold established by resistor R17 and the lower threshold established by R16. The key dependent voltage is applied to all of the inverting inputs of comparators 56A through 56L, and those ones of the comparators whose associated reference voltage is below the applied voltage will produce low outputs. Those comparators whose reference voltage is above the applied voltage will produce high outputs.

As described above, comparator 56A has the highest reference voltage and comparator 56L the lowest reference voltage. When the telephone is in an off-hook state and no keys 54 are depressed, the applied voltage at terminal 28a is greater than all reference voltages. Therefore, all comparators produce low outputs. Since the DTMF generator 36 recognizes a signal that would be logically derived from all lows as valid, the direct output of comparator 56A is applied by inverter 73 to one of the inputs of OR gate 74 to produce a muting signal to DTMF generator 36. This prevents the generation of a dual tone signal by the DTMF generator 36 corresponding to a no key depressed or down, off-hook condition.

Comparator 56A, therefore, produces a high output whenever a key is depressed and is used to signal a key down condition. All other comparators 56B through 56L produce high outputs when the applied voltage at terminal 28a is below their respective reference voltages. Thus, one or more of the comparators are turned on or produce high outputs by depressing a selected key.

Each key on the keyboard has a unique location which may be designated by the particular row and column in which the key is located. It is this information which is used by DTMF generator 36 to generate the tone signals corresponding to the depressing of a key. Therefore, a key may be identified and DTMF generation may be controlled by deriving row and column signals to represent the depressed key. In order to derive the row and column signals for each key, it is first necessary to treat by the means of logic circuitry the outputs of the comparators 56A through 56L to obtain a signal which is equivalent to the input signal to code receiver 28. The logic elements used to derive this 1 out of 12 signal include the eleven inverters 60A through 60K and the eleven AND gates 62A through 62K.

The outputs of each of comparators 56B through 56L are connected by the associated one of inverters 60A through 60K to one of the two inputs of the associated one of AND gates 62A through 62K. The other input to each of the AND gates is connected directly to the output of the next higher one of comparators 56A through 56L. Therefore, the output of comparator 56A is connected directly to one input of gate 62A and the other input to that gate is connected to the inverted output of comparator 56B through inverter 60A. The lowest reference level inverter 56L produces a high output when the input is less than the reference voltage, and therefore being the last in the chain has a unique output for one key only and need not be decoded through the logic.

The voltage at the output of each AND gate 62 corresponds to the depression of a respective one of twelve of keys 54. Two examples of how this arrangement of comparators 56, inverters 60 and AND gates 62 generate a unique one-of-twelve output equivalent to the voltage at terminal 28a will now be described. For ease of description hereinafter it is assumed that the output of AND gate 62A corresponds to depressing of the number "1" key whereas the outputs of gates 62B through 62K correspond to depressing keys 2 through 9, asterisk (*) and Zero (0) respectively. As previously described, the output of comparators 56L is unique to a single key which is assumed to be the octalthorpe (#).

In the first example, it is assumed that the user has depressed the number 1 key. The depressing of that key lowers the voltage at terminal 28a sufficiently to cause comparator 56A to turn on. All other comparators remain off. The high output of 56A is applied to one input of AND gate 62A. Since the input voltage is below the reference voltage of comparator 56A but above that of 56B, comparator 56B maintains a low output. Inverter 60A, connected to the output of 56B, translates the low to a high which is applied to the other input of gate 62A. The gate produces a high output corresponding to the two high inputs. Since the outputs of all comparators whose reference voltage is below the input voltage are low, AND gates 62B through 62K will produce low outputs corresponding to their associated directly connected comparator. Also, comparator 56L produces a low output. Thus, the voltage at the output of gate 62A corresponds to the depressing by the user of the number 1 key.

In the second example, it is assumed that the user has depressed the number 2 key. The depressing of this key lowers the input voltage so that both comparators 56A and 56B are turned on. All other comparators are off and their directly connected AND gates produce low outputs. As in the previous example, the high output of 56A is applied to one input of gate 62A. In this example, however, 56B is also producing a high output which is translated to a low by inverter 60A, therefore causing gate 62A to have a low output. Gate 62B has one high input corresponding to the output of comparator 56B and a second high input derived from the low output of comparator 56C through an inverter 60B (both not shown). Therefore, of all AND gates 62, only the one corresponding to a voltage generated when key 2 is depressed will have a high output, that is, gate 62B. As the input voltage is lowered by the depressing of higher number keys, those AND gates which are above and below the one associated with the key being depressed are turned off. Those gates which are above the one associated with the depressed key are turned off by the inverted high output of a comparator which appears at one of the inputs to the gate as a low through the associated inverter. Those gates which are below the one associated with the depressed key are turned off by the low output of a comparator which appears at one of the gate input directly from that comparator.

This key representative voltage must then be decoded to provide the row and column information needed for the operation of DTMF generator 36. This decoding is provided by the seven OR gates 64A through 64G. For ease of illustration, only three of the OR gates are shown. Four of the gates 64A through 64D are used to decode the particular one of four possible rows that a key lies in. The other three gates 64E through 64G are used to decode the particular one of three possible columns that a key lies in. Each of gates 64A through 64D have three inputs, whereas each of gates 64E through 64G have four inputs. The inputs to the gates are connected to the outputs of comparator 56A through L and AND gates 62A through 62K in the manner to be described hereinafter.

On a standard push button telephone keypad the keys bearing the numbers "1", "2" and "3" all lie in row one. In order for gate 64A to decode this row when any one of those keys are depressed, the three inputs to the gate are connected to the outputs of gates 62A, 62B and 62C (not shown). A high output of any of those elements cause gate 64A to generate a high indicating that the depressed key is in row one. It is also necessary for a signal to be generated which indicates the column in which the depressed key is located. Assume that the user has depressed the "3" key. That key is located in the third column. Decoding of that column is provided by gate 64G. The four inputs to that gate are connected to the output of AND gate 62B and, while not shown, to the output of AND gate 62F and, 62I and comparator 56L. Gates 62F and 62I correspond to the number "6" and "9" keys.

In a similar manner, each of gates 64B through 64F are connected to various ones of the outputs of gates 62A through 62K to decode rows 2, 3 and 4 and columns 1 and 2. These connections are provided in Table 1 below:

TABLE 1

| OR GATE | INPUTS CONNECTED TO | DECODES |
|---|---|---|
| 64B | 62D, 62E, 62F | Row 2 |
| 64C | 62G, 62H, 62I | Row 3 |
| 64D | 62J, 62K, 56L | Row 4 |
| 64E | 62A, 62D, 62G, 62J | Column 1 |
| 64F | 62B, 62E, 62H, 62K | Column 2 |

The outputs of each of gates 64 are connected by the respective one of the seven diodes D9A through D9G (poled as shown) to the inputs of DTMF generator 36. The diodes serve to decouple the OR gates in a low state from generator circuit 36. The decode row and column information is used by circuit 36 for generating the tone corresponding to the depressed key. As shown in FIG. 1b, the output of circuit 36 is connected by resistor R1 to winding 34d of transformer 34.

Also included in code receiver 28 is the combination of amplifiers 68, 70 and 72, OR gate 74, resistor R18 and capacitor C4. This combination which is connected between terminal 28a and the muting input to generator circuit 36 serves to provide dynamic muting for the DTMF generator. This muting is needed to prevent the generation of multiple tones by circuit 36 as a result of the exponential rise or fall in voltage which occurs when a key is depressed or released. This exponential rise occurs as a result of capacitance in the conductors of system 10. The multiple tones if not muted would give rise to misdialing.

Capacitor C4 which is connected in series between terminal 28a and the input to amplifier 68 and resistor R18 which is connected between the input and output of the amplifier function in combination with the amplifier as a differentiator, i.e. the amplitude of the voltage at junction 76, is related to the rate of change of the voltage at the input, i.e. at terminal 28a, to the differentiator by the time constant R18-C4. Therefore, when a key is depressed or released, the voltage at terminal 28a either rises or falls in a relatively rapid but exponential manner and the amplitude of the voltage at junction 76 is quite high. As the voltage approaches it steady state value at terminal 28a, whether that be for the depressed or released key, its rate of change decreases and the amplitude of the voltage at junction 76 decreases.

The output of amplifier 68 is connected at junction 76 to the inverting input of amplifier 70 and the non inverting input of amplifier 72. The noninverting input of amplifier 70 is connected to a bias voltage which is set at $\frac{1}{4}$Vcc, whereas the inverting input of amplifier 72 is connected to bias voltage which is set at $\frac{3}{4}$Vcc. The outputs of amplifiers 70 and 72 are connected to OR gate 74. The output of the gate is connected to the muting input of circuit 36. Amplifiers 70 and 72 function as analog level detector comparators. When either of amplifiers 70 and 72 turns on, a muting signal is produced by gate 74 to circuit 36. The biases to the amplifiers are such that amplifier 70 turns on for positive transistions and amplifier 72 turns on for negative transitions. In this manner, circuit 36 generates tone signals only when the voltage at terminal 28a is both in the steady state and corresponds to the depressing of a key.

In addition to the ORing of signals from the integrator, gate 74 receives inputs from two other sources for the purpose of muting the DTMF generator 36. One of these, previously described, is the off-hook, no-key down signal generated by comparator 56A. The fourth input is generated by the loop detect circuit 30 at its terminal 30a and serves to mute the generator 36 when the telephone is on-hook. That input is connected to gate 74 by inverter 75. The lowest input voltage level at terminal 28a is generated when the octalthorpe key is depressed. That voltage causes comparator 56L to turn on. This voltage then must be less than the lowest reference voltage, zero volts not included. Therefore, in an idle state or on-hook condition of telephone 40, the current through resistor R14 is zero and, hence, the voltage at terminal 28a is zero. Since this is a valid input voltage to the code receiver, the output of the loop detector must be used to mute the generator 36 when the telephone is on-hook. A DTMF generator 36, which responds to row and column signals, may be implemented by any one of a number of different chip types, such as the type S2559 chip available from American Microsystems Inc. of Santa Clara, Calif.

While FIG. 4 has shown logic circuitry (OR gates 64) that provides signals indicative of a particular row and column corresponding to each key depressed, it should be appreciated that the logic circuitry may be arranged to provide a binary output whose value is uniquely indicative of the key depressed. Such a circuit may be designed by assigning to each of the twelve keys a unique binary number and then arranging the connections of AND gates 62 and comparator 56 such that the associated OR gates decode the unique number associated with each key. As there are only 12 keys, only four such OR gates are needed. Where the logic circuitry provides the unique binary numbers, a DTMF chip responsive to such binary signals or a properly programmed microprocessor may be used to generate the associated DTMF signals. One such type of binary chip is the TP5395 chip available from National Semiconductor Corp. of Santa Clara, CA. It should also be appreciated that code receiver 28 may be arranged to generate pulses to the central office rather than DTMF signals. In that case the pulses may be generated by the use of a TP5393 chip also available from National Semiconductor.

The sequence of operation of system 10 will now be described first in connection with a system subscriber and then with a call originated outside of the system to the subscriber.

Subscriber Originated Call

When the subscriber desires to originate a call he causes the hookswitch 44 of telephone set 40 to change from the on-hook to the off-hook position. This change in hookswitch position allows the combination of the system voltage, Vcc, and resistors R8, R9, R10 and R14 to generate a voltage at terminal 28a of code receiver 28.

This voltage is detected by the code receiver 28 and provides a mute signal to the DTMF generator 36. Loop detect circuit 30 also senses the presence of the off-hook condition and generates a signal to operate line relay 26.

The operation of relay 26 causes the T and R conductors 14 to be connected to the winding 34a of transformer 34. This connection creates a d-c current path that forwards the off-hook condition to the C.O. In response thereto the C.O. provides the dial tone signal to the system. The dial tone is connected by windings 34b and 34c of the transformer and conductors 12a and 12b to the telephone set. Relay 22 remains in its unoperated condition.

In response to the dial tone the subscriber commences the dialing of the telephone number he is calling. As the subscriber depresses each key the combination of Vcc and the associated one of resistors R13 and R14 causes a predetermined voltage to appear at terminal 28a. Code receiver 28 decodes that voltage in a manner so as to provide row and column input signals to generator 36. The DTMF tones corresponding to the depressed key are then generated. These tones are connected by transformer 34 to the T and R conductors and, therefore, to the C.O. After dialing, the system is in a conversation or communication mode. When the party being called answers, the subscriber may then converse with that party in the same manner as if the subscriber has originated the call from an ordinary telephone.

The subscriber terminates the call by causing the hookswitch to go from the off-hook position to the on-hook position. The return of the hookswitch to the on-hook position allows the contacts of line relay 26 to return to their unoperated conditions. The connection of the telephone set to the T and R conductors is broken and system 10 is returned to an idle state.

Call to the Subscriber

When the C.O. detects a call for the subscriber of system 10, it places the ringing signal on the T and R conductors. Line relay 26 in its unoperated condition routes the ringing signal to ring detect circuit 38. Circuit 38 detects the ringing signal and generates therefrom the warble tone which is used to ring telephone set 40. Circuit 38 also upon detection of the ringing signal causes ringing relay 22 to be operated. The operation of the ringing relay connects the warble tone to the telephone.

In response to the warble tone, the subscriber causes the hookswitch to change from its on-hook to off-hook position. The activation of the hookswitch establishes a d-c path across conductors 12a and 12b which allows circuit 38 to sense the d-c current flowing therein. In response thereto circuit 38 allows relay 22 to be returned to its normal state thereby disconnecting the warble tone. Circuit 30 detects the off-hook condition of the telephone and generates a signal to operate relay 26 to thereby connect the T and R conductors directly to the telephone. In response to this connection the C.O. removes the ringing signal from the conductors. Thus, the system is placed in the conversation mode.

At the end of the conversation, the system is returned to its idle state by the subscriber causing the hookswitch to go from off-hook to on-hook. As described above, this change in hookswitch condition allows the contacts of relay 26 to return to their unoperated positions.

Should the subscriber not respond to the warble tone after some period of time, the calling party usually places its telephone set on-hook. This breaks the calling party's connection to the C.O. The C.O. ceases the transmission of the ringing signal. When circuit 38 no longer detects the ringing signal it stops generating the warble tone and returns the ringing relay to its unoperated state.

In summary, there has been shown in FIGS. 1 to 4 and described a system which makes use of the present invention for single line application. The single line application of the invention is able to coexist with any standard telephone sets present at the subscriber's location. The only requirement for this to occur is that the station wiring consist of four conductors, two of which are uncommitted. In this simplest form the invention consists of a single unconventional telephone and a master unit.

It is the concentration of the signalling, ringing, transmitting and receiving functions in the master unit rather than in the telephone that allows the present invention to make use of the unconventional telephones described above. While only a single line application of the present invention has been shown and described, it should be appreciated that the invention may also be used in a multi-line application. One such multi-line application is the key telephone system wherein a multiplicity of telephones all have access to a multiplicity of telephone lines as well as the capability of providing other functions. Such a system will now be described.

Figure 5:
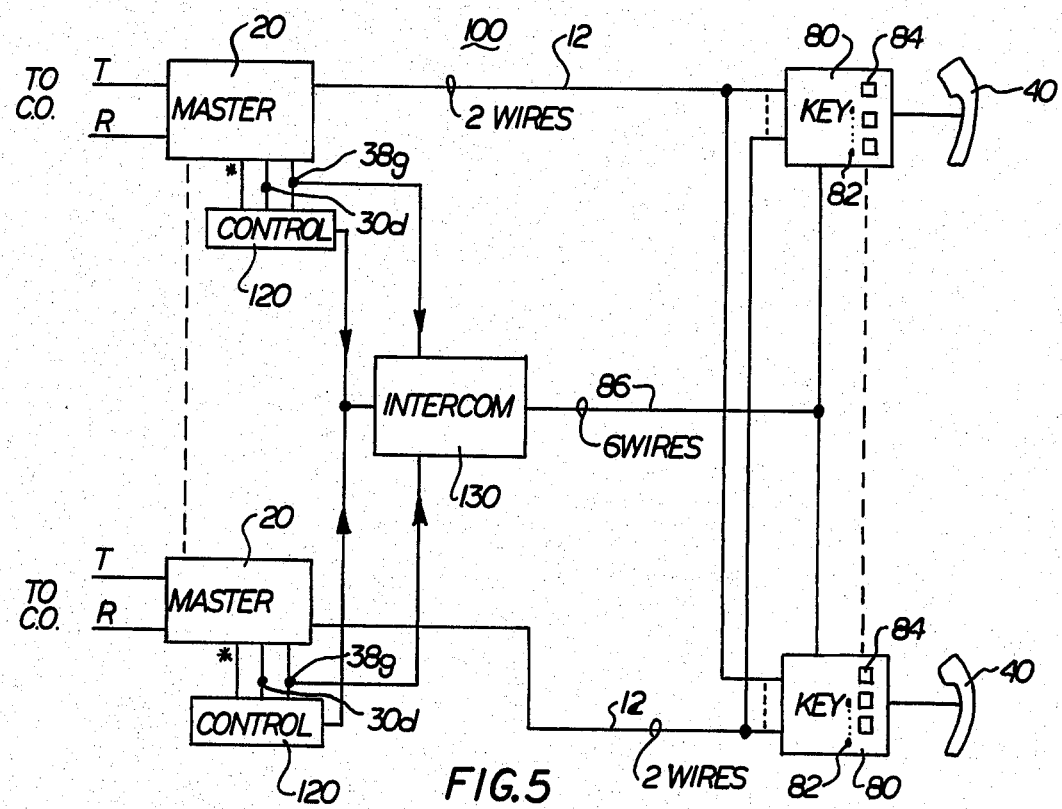
FIG. 5 is a block diagram of a multi-line application of the present invention in the form of a key system.

FIG. 5 shows the invention configured as a multi (N) line system 100 where each of the up to N central office lines is terminated in its own master unit 20 which is of the type described in FIG. 1a. Since this configuration necessitates the use of N master units, there may be a practical limit to the number of C.O. lines that can be served economically by the present invention. At present this number is in the order of up to five lines, i.e. $N \leq 5$, although various cost reducing factors may allow more such lines to be served in the future.

In support of each of the N master units there are N associated control circuits 120 and one intercom circuit 130. These additional circuit elements provide the control, signal and communication functions found in a typical key telephone system such as the Western Electric Co. 1A2 type key system. These circuits will be described in detail in FIGS. 6a and 6b, respectively. Also shown in FIG. 5 are N unconventional telephone sets 40 of the type described in FIG. 3 together with N companion key telephone stations 80. Each key telephone station includes N+1 key switches, collectively designated as 84 and N indicators collectively designated as 82, such as light emitting diodes (LED), which correspond to the number of central office lines in the system. As will be explained in connection with FIG. 7, N of the N+1 key switches located in each station unit 80 are used to manually select an associated one of the central office lines. The remaining key switch is used for intra system communications through intercom 130 in the manner to be described hereinafter. Each master unit interconnects with all station units 80 over two wires analogous to the black and yellow pair 12 of the single line system shown in FIG. 1a. With one pair of wires per central office line, it follows that a system such as that shown in FIG. 5 which serves N central office lines requires N pair or 2N wires to give all telephones access to all lines. Intercom 130 is connected with all of the N station units by only the six (6) wires designated as 86.

Figure 6A:
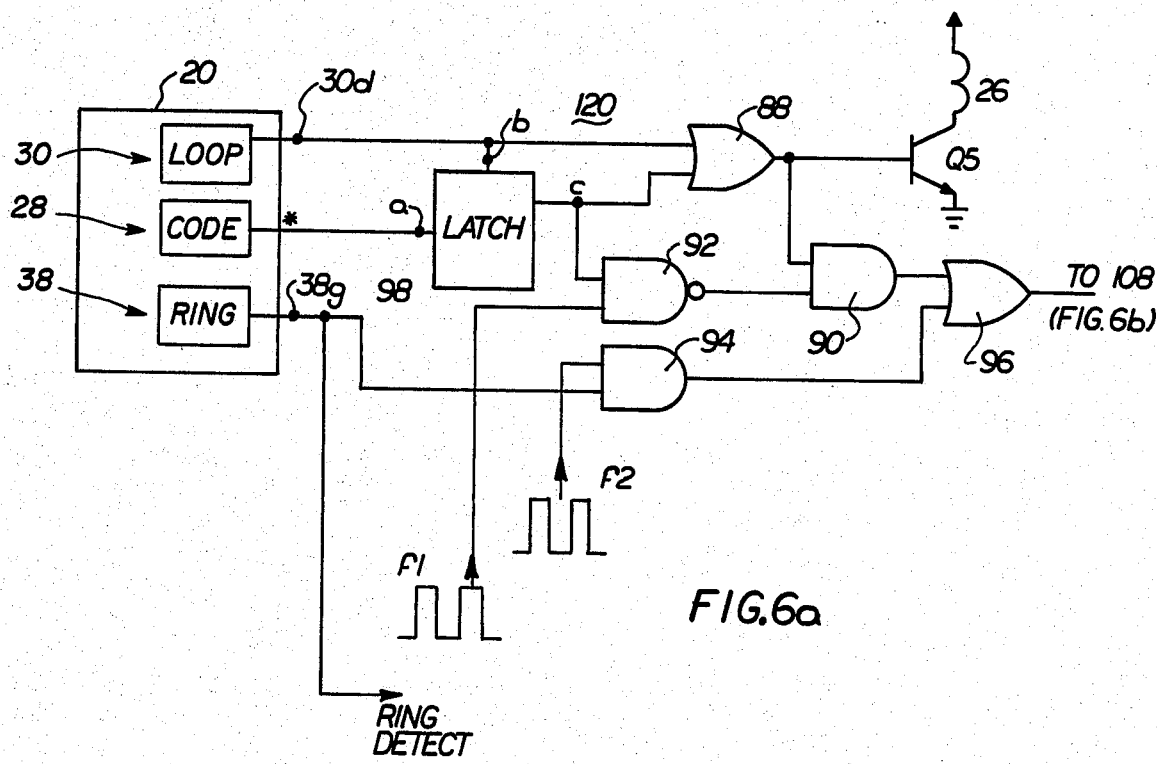
FIG. 6a is a schematic diagram of the control circuit of the system shown in FIG. 5.

Referring now to FIG. 6a there is shown master unit 20 and a circuit schematic for control circuit 120. The master unit which includes code recevier 28, loop detector 30 and ringing detector 38 provides three signals to the control circuit. The signal at terminal 30d of the loop detector appears whenever the telephone set is off hook as previously explained. The signal at terminal 38g (see FIG. 2) of the ringing detector is generated by that circuit 38 whenever ringing is present. This signal indicates the presence of an incoming call. The third signal is that generated by the code receiver 28 when the user depresses the asterisk (*) key on one of the N telephone sets 40. This signal which is representative of the depression of that key is designated in FIG. 6a by the * symbol and is generated by the code receiver at the output of AND gate 62J. (see FIG. 4).

When a telephone set 40 presents an off-hook condition to a master unit 20, the loop detect circuit 30 generates a positive signal at terminal 30d which is connected to one input of two input OR gate 88. The output of gate 88 is connected to the driver for line relay 26 of the master unit and one input of a two input AND gate 90. The driver for relay 26 is shown in FIG. 6a as a transistor Q5 with the output of gate 88 being connected to the base thereof. The emitter of the transistor is connected to ground and its collector is connected to the relay coil. The high signal at 30d appears at the output of gate 88 and, hence, causes relay 26 to operate.

This same signal also permits gate 90 to produce a high output provided the other input to the gate 90 which comes from the output of NAND gate 92 is high. Assuming the output of gate 92 is high, the output of gate 90 will therefore be high whenever the telephone set is off hook, i.e. in a normal conversation or dialing mode. The output of gate 90 is connected to one input of two input OR gate 96. The other input to gate 96 is from AND gate 94. The output of gate 96 is connected through intercom 130 to the associated LED controls in station units 80. If the output of gate 94 is low, the high output of gate 90 produces a high output from OR gate 96. This high signal causes the light emitting diode in each station corresponding to a given line to illuminate to thereby indicate an off-hook condition of the associated telephone set.

The asterisk output signal of the code receiver is used to establish a "hold" condition when there is an incoming call for a system subscriber. This hold condition retains the seizure of the incoming central office line while at the same time permitting the system user to break connection with the communication path. This is often done when the system user wishes to transfer an incoming call. The user transfers the call by first placing the calling party on "hold" by depressing the asterisk key, then hanging up on that party, and finally dialing by use of intercom circuit 130 the code of the extension of the party to whom the call is to be transferred. The new called party can now pick up on the waiting call and establish voice communications.

As shown in FIG. 6a, a latch circuit 98 has its input, designated as 98a, connected to the asterisk output signal of the code receiver. When that signal goes high, the output of the latch designated as 98c also goes high. The output 98c is connected to the other input of OR gate 88 and to one input of two input NAND gate 92 thereby placing a high on those inputs. The high at the input of gate 88 connected to 98c causes the output of the gate to remain high even when the loop detect signal at terminal 30d goes low as a result of the called party hanging up on the caller as part of the transfer sequence. Therefore, relay 26 is kept operated even though a closed loop is no longer detected by circuit 30. Thus, the hold condition has been established.

To indicate that a line or incoming call has been placed on hold, the high latched output 98c is ANDed with the square wave of frequency $f_1$ present at the other input of gate 92. This ANDing produces the same square wave at the output of the gate. Since the output of OR gate 88 is high, it follows that the output of AND gate 90 and therefore the LED control signal at the output of OR gate 96 will also turn on and off at the frequency of $f_1$. The frequency $f_1$ is typically set at 1 Hz. This turning on and off of the LED produces the well-known blinking signal indicative of a line that has been placed on hold.

The reset control for latch 98 is derived from the loop detect signal which is connected to the latch at the terminal designated as 98b. The latch 98 resets in response to low-to high state transitions at terminal 98b as would be the case when going off hook. The reset is insensitive to the high-to-low transitions associated with a telephone going on hook. Therefore, after a call is placed on hold, the action of the user which placed the call on hold in going on hook has no effect on the latch state. It is only when a user goes off hook as would be the case when the new called party picks up on the line that the latch is reset and the hold condition is cancelled. It should be appreciated that the latch resets each time an off hook is sensed, therefore guaranteeing that the latch will be in an off state whenever a system user initiates a call.

As described previously in connection with FIG. 2, the voltage at terminal 38g goes high whenever circuit 38 detects central office ringing on the incoming line. In the key system application, this signal is used to flash the LED corresponding to the ringing line in all of the N key stations. This signal also causes, as described previously, an audible warble tone at telephone set 40 to alert the user.

Referring to FIG. 6a, terminal 38g is shown connected directly to one input of two input AND gate 94. The other input of the gate is connected to a square wave whose frequency is $f_2$. The frequency $f_2$ is selected to be unequal to the frequency $f_1$ of the call on hold indicating square wave present at gate 92. When no ringing is present, the signal on 38g is low and, hence, the output of gate 94 is low. However, when ringing is present, the signal on 38g is high and the square wave $f_2$ will appear at the output of gate 94. This square wave will also appear at the output of OR gate 96 since the output of gate 90 must be low during ringing as relay 26 must be unoperated for ringing to be applied to the ring detect circuit 38. In summary, then, control circuit 120 generates the following four LED control signals.

| STATE | GATE 96 OUTPUT | |
|---|---|---|
| 1. IDLE | LOW (LED UNLIT) | |
| 2. BUSY-CONVERSATION OR DIALING | HIGH (LED BRIGHTLY LIT) | |
| 3. ON HOLD | ALERNATING HIGH/LOW AT FREQ $f_1$ | LED FLASHES ON AND OFF |
| 4. RINGING | ALERNATING HIGH/LOW AT FREQ $f_2$ | AT THE RATE OF $f_1$ OR $f_2$ |

Figure 6B:
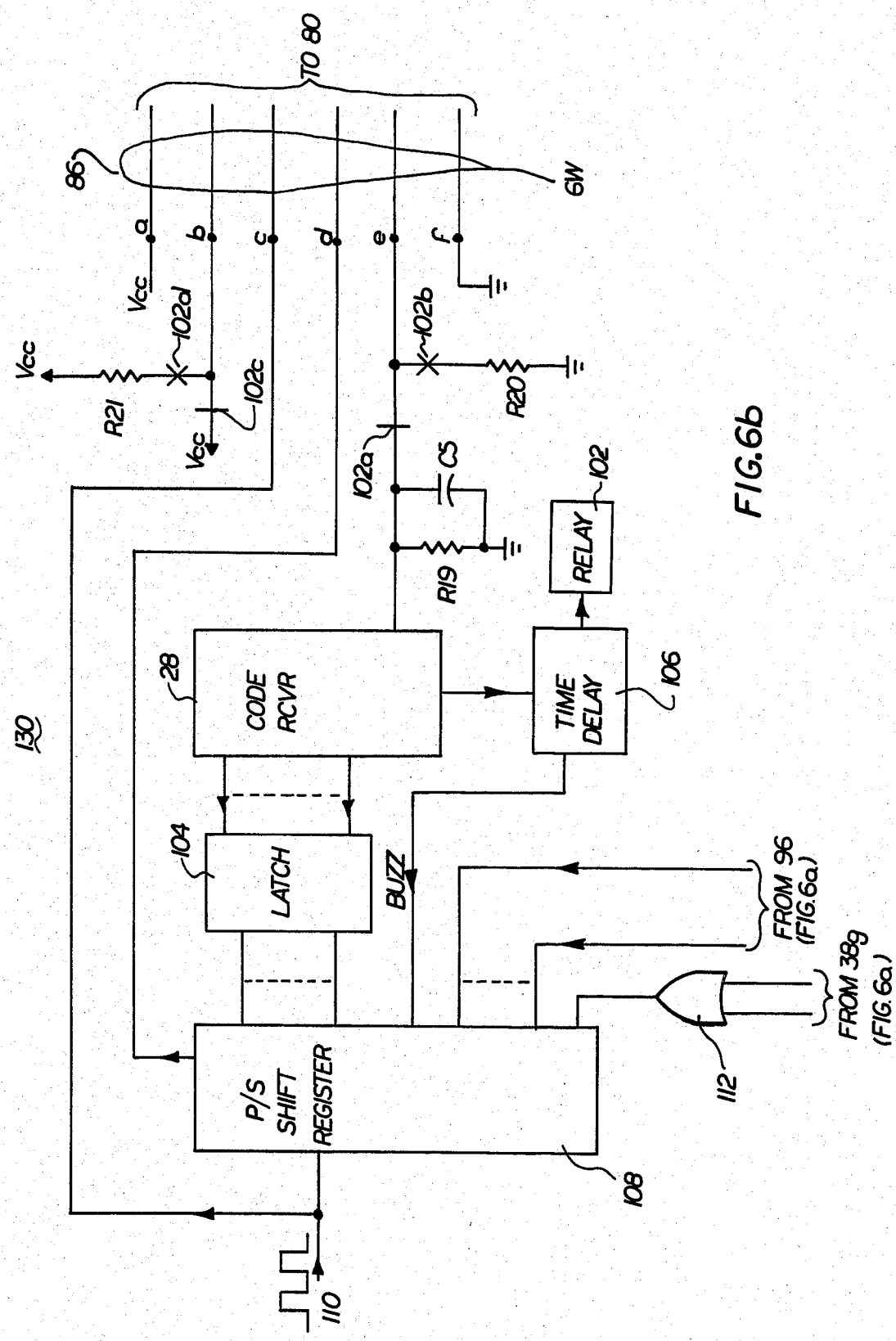
FIG. 6b is a schematic diagram of the intercom circuit of the system shown in FIG. 5.

Referring now to FIG. 6b there is shown a simplified schematic of the intercom circuit 130 that is necessary to complete the key system master unit functions. The term intercom is used herein to encompass all intercommunication functions that do not involve connection to a central office line, i.e. intra system communications. This includes the functions of dialing and alerting to establish a voice communications path between two stations within the key system. Any one of the telephone instruments 40 may obtain access to the intercom by use of the intercom key of the switches 84 on the associated one of the key telephone stations 80. The key station is connected to the intercom by the six (6) wires 86.

As shown in FIG. 6b, these six (6) wires 86 are required to communicate line status information from the master unit to the key stations 80. Those two of the wires 86 designated as 86b and 86e function in the same manner as the previously described normal communication pair associated with the single line system. Intercom 130 includes a relay 102 which provides connections between the intercom and each of the N stations 80. Relay 102 includes the N.C. contacts 102a and 102c. Contacts 102a connect conductor 86e to the code receiver included in the intercom. This code receiver is identical to that previously described for the single line application and therefore carries the same numerical designation 28 as that receiver (see FIG. 1b). The parallel combination of a resistor R19 and a capacitor C5 has one end connected to ground. Contacts 102c connect conductor 86b to the voltage Vcc. These two wires (86b, 86e) therefore, provide in combination with contacts 102a and 102c the voltage Vcc and a known terminating resistor R19 to the instrument 40 when the user is either dialing or communicating over the intercom path. Resistor R19 in combination with Vcc and the previously described resistors R13 in the instrument 40 (see FIG. 3) are used to generate a unique voltage for each key 54 depressed on the instrument keyboard 42. A complete description of this action was provided in conjunction with the description of FIG. 3.

Relay 102 also includes the N.O. contacts 102b and 102d. Contacts 102b connect conductor 86e at the right of contacts 102a to one end of a resistor R20 the other end of which is connected to ground. Contacts 102d connect conductor 86b at the right of contact 102c to one end of the resistor R21 the other end of which is connected to Vcc.

In the case of the N line key system 100 being described herein, dialing on the intercom path is used to access another one of the N key stations 80 for the purpose of transferring or conferencing a call. For one station 80 to establish voice communications with another intra system station the calling user must first go off hook and then depress the key 84 corresponding to the intercom on the station unit 80. This connects the instrument 40 to the intercom circuit 130 by the wires 86b and 86e. At this time the relay 102 is unoperated and therefore the key station is connected directly to the code receiver 28. The user then enters the number code of the station which is being called through the keyboard on the instrument 40.

The code receiver decodes the keyboard entry and inputs the information to the latch 104 also included in the intercom. The latch stores the number code or, in effect, the address of the station being called. Simultaneously therewith the code receiver generates an output signal to the time delay circuit 106. When the system 100 includes less than 12 stations each station may be identified by a unique one of the 12 keys in the instrument keyboard. In that case the output signal to circuit 106 may be generated by the code receiver when it decodes the depressing of the key. The signal used to strobe the number code into the latch may then simply be a delayed version of that output signal. For systems having more than 12 stations it may be necessary to depress at least two of the keys in succession in order for the user to call one of the stations. In that case the output signal and the strobe signal may be generated in the code receiver in any reasonable manner. As will be described in more detail hereinafter, the time delay circuit 106 first sends a signal to the shift register 108. This signal is used to create a timed buzzing signal to the called station. The time buzzing signal is usually one second in duration. The time delay circuit then provides a signal to operate relay 102.

When relay 102 operates, contacts 102a open to remove the code receiver from the circuit and contacts 102b close to connect resistor R20 between conductor 86e and ground. Contacts 102c open to remove the directly connected voltage Vcc. Contacts 102d close to connect the series combination of a resistor R21 and Vcc to conductor 86b. The opening of 102c and the closing of 102d thereby replaces the directly connected voltage with a resistively connected one. Resistors R20 and R21 provide current to both instruments, that is, the calling and called, during conversation.

Ringing, LED control and the intercom alerting (timed buzz) signals appear at each of stations 80 in the form of serial pulses. The parallel to serial (P/S) shift register 108 converts the ringing, LED control and alerting signals, all of which appear at the inputs to the register as parallel signals, into a serial bit stream that is transmitted to the stations over conductor 86d. The ringing signals from each of the N master stations are connected to the respective one of the N inputs of OR gate 112. The gate provides a single ringing input to the register. Each input to the shift register 108 is represented by a single bit on the output. Therefore, the totality of inputs determines the length of the binary word transmitted from the register to the station. The clock signal is generated by a suitably arranged generator (not shown). Power to the circuits in the station 80 is provided over leads 86a which are directly connected to Vcc and 86f which is directly connected to ground.

Figure 7:
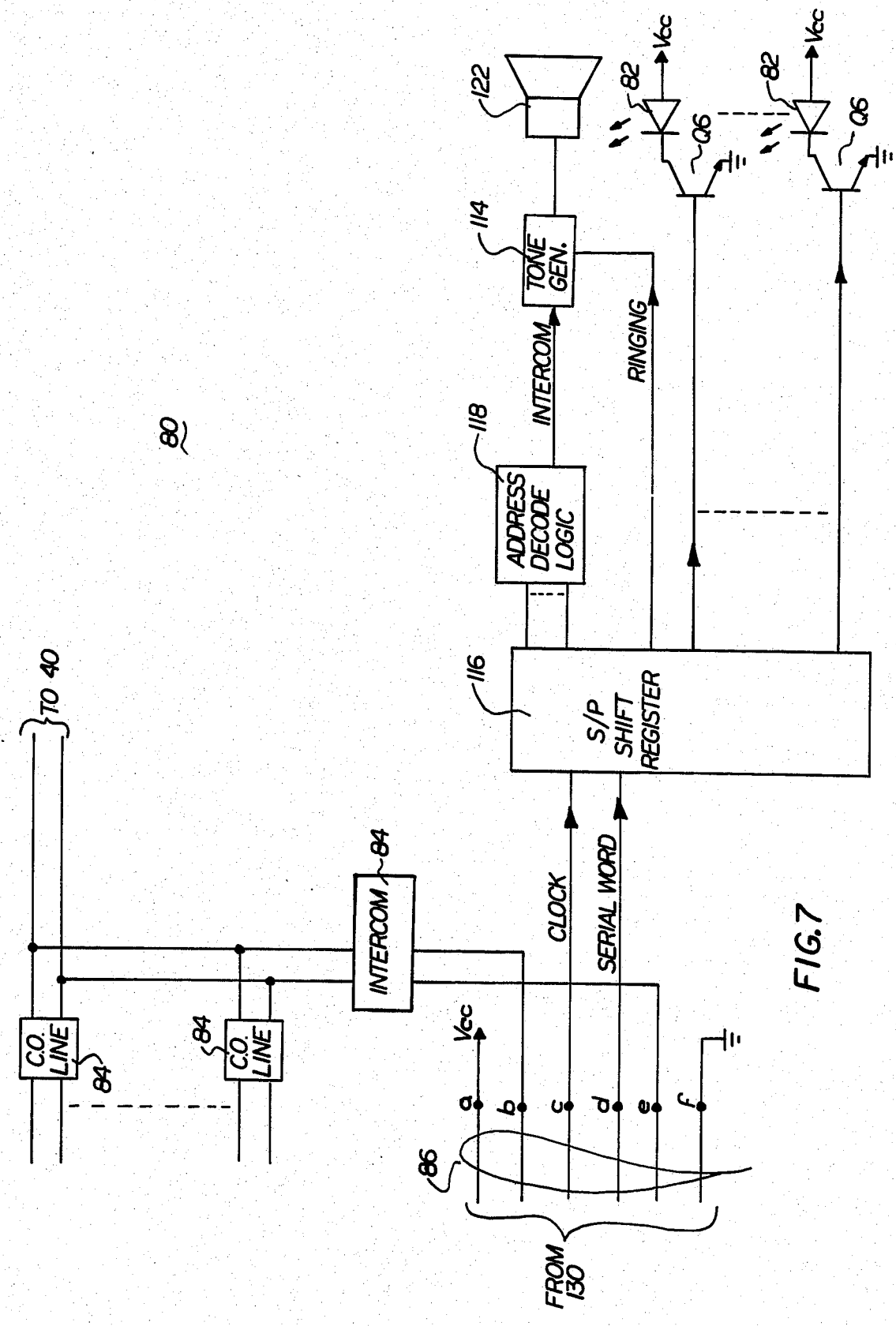
FIG. 7 is a schematic diagram of the key telephone of the system shown in FIG. 5.

A typical key station 80 is shown in FIG. 7. It can be seen that the six leads 86a-f are interconnected with the intercom circuit 130 of FIG. 6b. In addition, there is one pair of wires for each of the N central office lines which interconnects the key station with the associated one of the master unit modules 20.

To place an outgoing call the user picks up the telephone 40, depresses that one of the keys 84 corresponding to the C.O line desired and places the call through the associated one of the master units in a manner identical to that described for the single line system. Incoming calls are answered by depressing that one of the keys whose associated LED 82 is flashing in unison with the audible ringing signal. Unlike the single line system, the key telephones use a speaker 122 driven by tone generator 114 to audibly alert the user to an incoming call. Tone generator 114 is controlled by that one of the bits contained in the binary word generated by the intercom circuit which corresponds to the input to register 108 from gate 112 (FIG. 6b).

The binary word transmitted to the stations from the intercom is decoded by the serial to parallel (S/P) shift register 116. Information contained in the pulse stream is clocked through the shift register by the clock signal 110 received from intercom 130 in such a way that the state of each output port of the shift register corresponds directly to the state of a particular bit. For example, if serial bit number 5 indicates ringing is present when it is a "1", the corresponding output port on the shift register will be high. If a particular bit alternates between "1" and "0", the corresponding output port on register 116 will go high and low at a maximum rate which is equal to the repetition rate of the binary word. The N LED control signals appear, as described previously, either as all "1's", all "0's" or alternate at the frequencies $f_1$ or $f_2$, at the N output ports of register 116 that drive the LED's 82. These ports are connected to the N LED's by the associated one of the N transistors Q6.

Generally, the first set of bits serve as the station address whenever one user dials another's extension number. These are decoded by a suitably arranged logic in the form of decoding circuit 118. When the station address bit pattern or binary number on the output of the shift register 116 is decoded by logic circuit 118, the output of the logic circuit turns on the tone generator 114 to alert the user that another user of system 100 wishes to talk over the intercom path. When the tone generator is activated by the logic circuit 118 as opposed to the ringing signal, the output is a distinctive buzz rather than warble tone which is used to alert an incoming (nonsystem originated) call for that user.

In summary, there has been described a multi-line application of the present invention in which a multiplicity of unconventional telephones are able by their own associated key stations to have access to any one of a multiplicity of central office lines. Each C.O. line has associated therewith a master unit and each key station allows a system user to receive a nonsystem originated call through any master unit or place a call to a nonsystem subscriber through any master unit. The manner in which the unconventional telephone and the master unit interact when a nonsystem call is either received or placed is identical to that action described for the single line application.

The multi-line application also includes a control circuit associated with each master unit and a single intercom circuit. These circuits provide in combination the control, signal and communication functions normally found in a typical key telephone system. These functions include visual indications of the ringing, off-hook status and placing on hold of a given unconventional telephone. They also include the signal to the key telephone station which allows that station to alert a system user to an incoming nonsystem originated call or to an intrasystem call. Finally, they also provide the means by which system users may make intrasystem calls and transfer non-system originated calls from one user to another.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A system for providing service between a subscriber and a central office comprising:
   (a) at least one telephone set adapted for use in said system, said telephone set having at least information entering means, receiver means for converting electrical signals to acoustical signals, transmitter means for converting acoustical signals to electrical signals and switch means,
      (i) said switch means having one position when said telephone set is on-hook and another position when said telephone set is off-hook, each of said switch means positions providing said telephone set with a predetermined electrical characteristic,
      (ii) said information entering means providing a multiplicity of unique impedances which are only non-reactive for said telephone set, each associated with the entry by said subscriber when said telephone set is off-hook of a respective one of a multiplicity of discrete pieces of information; and
   (b) at least one interface means electrically connected between said central office and said telephone set, said interface means receiving:
      (i) electrical information carrying signals and ringing signals from said central office, said information carrying signals being received when said telephone set is off-hook and said ringing signals being received when said telephone set is on-hook, and
      (ii) electrical signals from said telephone set when said telephone set is off-hook,
   said interface means including means responsive to said ringing signal for generating an alerting signal and means responsive to said unique non-reactive impedances in combination with said off-hook electrical characteristic for generating central office interpretable dialing signals
   said interface means transmitting:
      (i) to said central office said dialing interpretable signals, and (ii) to said telephone set information signals and said alerting signal, said telephone set responsive to said alerting signal for alerting said subscriber.

2. The system of claim 1 wherein said information entering means includes a multiplicity of dialing means and means responsive to the operation of a respective one of said dialing means by said subscriber when said telephone set is off-hook for providing said associated one of said multiplicity of said unique non-reactive impedances.

3. The system of claim 2 wherein said multiplicity of dialing means includes a keyboard having a multiplicity of key means each of said key means when unoperated being an open circuit and when operated a short circuit and said unique non-reactive impedances providing means includes an array of a multiplicity of non-reactive impedance means each of said impedance means being associated with a respective one of said key means, said impedance means providing said unique non-reactive impedance when said key means is operated.

4. The system of claim 1 wherein said subscriber has station wiring having at least four conductors, two of said conductors being used to connect telephone sets capable of being directly connected to said central office which are located at said subscriber directly to said central office and said interface means being electrically connected to said central office by said two directly connecting conductors and electrically connected to said adapted telephone set by two of said conductors which are not said directly connecting conductors.

5. The system of claim 1 wherein said telephone set is connected to said interface means by a first pair of conductors and said interface means is connected to said central office by a second pair of conductors, said ringing signal responsive means being connected to said second pair when said telephone set is on-hook, said means including:
(a) means responsive to said signals on said second pair for detecting said ringing signal and generating a signal when said ringing is detected, and
(b) means responsive to said ringing detected signal for generating said alerting signal.

6. The system of claim 5 wherein said interface means further includes switching means for connecting and disconnecting said ringing signal responsive means from said first pair of conductors, said ringing signal responsive means ordinarily being disconnected from said first pair, said ringing signal responsive means further including means responsive to said ringing detected signals for generating a control signal to said switching means, said switching means responsive to said control signal for connecting said alerting signal generating means to said first pair.

7. The system of claim 1 wherein said means responsive to said non-reactive impedances includes:
(a) means for generating a unique signal having a predetermined amplitude associated with a respective one of said unique non-reactive impedances; and
(b) means responsive to said unique signals for generating said central office dialing interpretable signals.

8. A system for providing service between a subscriber and a central office comprising:
(a) at least one telephone set adapted for use in said system, said telephone set having at least information entering means, receiver means for converting electrical signals to acoustical signals, transmitter means for converting acoustical signals to electrical signals and switch means,
(i) said switch means having one position when said telephone set is on-hook and another position when said telephone set is off-hook, each of said switch means positions providing said telephone set with a predetermined electrical characteristic,
(ii) said information entering means having a multiplicity of dialing means and responsive to the operation of a respective one of said dialing means by said subscriber when said telephone set is off-hook for providing an associated one of a multiplicity of unique impedances which are only non-reactive for said telephone set; and
(b) at least one interface means electrically connected between said central office and said telephone set, said interface means receiving:
(i) electrical information carrying signals and ringing signals from said central office, said information carrying signals being received when said telephone set is off-hook and said ringing signals being received when said telephone set is on-hook, and
(ii) electrical signals from said telephone set when said telephone set is off-hook,
said interface means including means responsive to said ringing signal for generating an alerting signal and means responsive to said unique non-reactive impedances in combination with said off-hook electrical characteristic for generating central office interpretable dialing signals
said interface means transmitting:
(i) to said central office said dialing interpretable signals, and
(ii) to said telephone set said information signals and said alerting signal, said telephone set responsive to said alerting signal for alerting said subscriber.

9. The system of claim 8 wherein said multiplicity of dialing means includes a keyboard having a multiplicity of key means each of said key means when unoperated being an open circuit and when operated a short circuit and said unique non-reactive impedances providing means includes an array of a multiplicity of impedance means each of said impedance means being associated with a respective one of said key means, said impedance means providing said unique non-reactive impedance when said key means is operated.

10. The system of claim 8 wherein said subscriber has station wiring having at least four conductors, two of said conductors being used to connect telephone sets capable of being directly connected to said central office which are located at said subscriber directly to said central office and said interface means being electrically connected to said central office by said two directly connecting conductors and electrically connected to said adapted telephone set by two of said conductors which are not said directly connecting conductors.

11. The system of claim 8 wherein said telephone set is connected to said interface means by a first pair of conductors and said interface means is connected to said central office by a second pair of conductors, said ringing responsive means being connected to said second pair when said telephone set is on-hook, said means including:

(a) means responsive to said signals on said second pair for detecting said ringing signal and generating a signal when said ringing is detected, and (b) means responsive to said ringing detected signal for generating said alerting signal.

12. The system of claim 11 wherein said interface means further includes switching means for connecting and disconnecting said ringing signal responsive means from said first pair of conductors, said ringing signal responsive means ordinarily being disconnected from said first pair, said ringing signal responsive means further including means control signal to said switching means, said switching means responsive to said control signal for connecting said alerting signal generating means to said first pair.

13. The system of claim 8 wherein said means responsive to said non-reactive impedances includes:

(a) means for generating a unique signal having a predetermined amplitude associated with a respective one of said unique non-reactive impedances; and (b) means responsive to said unique signals for generating said central office dialing interpretable signals.

14. A system for providing service between a subscriber and a central office, said subscriber having station wiring consisting of at least four conductors, two of said conductors being used to connect any telephone sets capable of being directly connected to said central office which are located at said subscriber directly to said central office, said system comprising:

(a) at least one telephone set adapted for use in said system, said telephone set having at least information entering means, receiver means for converting electrical signals to acoustical signals, transmitter means for converting acoustical signals to electrical signals and switch means, (i) said switch means having one position when said adapted telephone set is on-hook and another position when said telephone set is off-hook, each of said switch means positions providing said telephone set with a predetermined non-reactive impedance, (ii) said information entering means providing a multiplicity of unique non-reactive impedances for said adapted telephone set, each associated with the entry by said subscriber when said telephone set is off-hook of a respective one of a multiplicity of discrete pieces of information; and (b) at least one interface means electrically connected to said central office by said two directly connecting conductors and electrically connected to said adapted telephone set by two of said conductors which are not said directly connecting conductors, said interface means receiving:

(i) electrical information carrying signals and ringing signals from said central office, said information carrying signals being received when said adapted telephone set is off-hook and said ringing signals being received when said telephone set is on-hook, and (ii) electrical signals from said adapted telephone set when said telephone set is off-hook, said interface means including means responsive to said ringing signal for generating an alerting signal and means responsive to said unique non-reactive impedances in combination with said off-hook non-reactive impedance for generating central office interpretable dialing signals said interface means transmitting:

(i) to said central office said dialing interpretable signals, and (ii) to said adapted telephone set said information signals and said alerting signal, said telephone set responsive to said alerting signal for alerting said subscriber.

15. The system of claim 14 wherein said information entering means include a multiplicity of dialing means and means responsive to the operation of a respective one of said dialing means by said subscriber when said telephone set is off-hook for providing said associated one of said multiplicity of said unique non-reactive impedances.

16. The system of claim 15 wherein said multiplicity of dialing means includes a keyboard having a multiplicity of key means each of said key means when unoperated being an open circuit and when operated a short circuit and said unique non-reactive impedances providing means includes an array of multiplicity of impedance means each of said impedance means being associated with a respective one of said key means, said impedance means providing said unique non-reactive impedances when said key means is operated.

17. The system of claim 14 wherein said telephone set is connected to said interface means by a first pair of conductors and said interface means is connected to said central office by a second pair of conductors, said ringing signal responsive means being connected to said second pair when said telephone set is on-hook, said means including:

(a) means responsive to said signals on said second pair for detecting said ringing signal and generating a signal when said ringing is detected, and (b) means responsive to said ringing detected signal for generating said alerting signal.

18. The system of claim 17 wherein said interface means further includes switching means for connecting and disconnecting said ringing signal responsive means from said first pair of conductors, said ringing signal responsive means ordinarily being disconnected from said first pair, said ringing signal responsive means further including means responsive to said ringing detected signals for generating a control signal to said switching means, said switching means responsive to said control signal for connecting said alerting signal generating means to said first pair.

19. The system of claim 14 wherein said means responsive to said non-reactive impedances includes:

(a) means for generating a unique signal having a predetermined amplitude associated with a respective one of said unique non-reactive impedances; and (b) means responsive to said unique signals for generating said central office dialing interpretable signals.

20. An interface means for use in a system providing service between a subscriber and a central office, said system having at least one telephone set adapted for use in said system, said telephone set having at least information entering means, receiver means for converting electrical signals to acoustical signals, transmitter means for converting acoustical signals to electrical signals and switch means, said switch means having one position when said telephone set is on-hook and another position when said telephone set is off-hook, each of said switch means positions providing said telephone set with a predetermined electrical characteristic, said information entering means providing a multiplicity of unique impedances which are only non-reactive for said telephone set each associated with the entry by said subscriber when said telephone set is off-hook of a respective one of a multiplicity of discrete pieces of information; said interface means being electrically connected between said central office and said telephone set, said interface means comprising:
  (a) means for receiving:
    (i) electrical information carrying signals and ringing signals from said central office, said information carrying signals being received when said adapted telephone set is off-hook and said ringing signals being received when said telephone set is on-hook, and
    (ii) electrical signals from said adapted telephone set when said telephone set is off-hook,
  (b) means responsive to said ringing singal for generating an alerting signal, and
  (c) means responsive to said unique non-reactive impedances in combination with said off-hook electrical characteristic for generating central office interpretable dialing signals
    (i) to said central office said dialing interpretable signals, and
    (ii) to said adapted telephone set said information signals and said alerting signal, said telephone set responsive to said alerting signal for alerting said subscriber.

21. The system of claim 20 wherein said telephone set is connected to said interface means by a first pair of conductors and said interface means is connected to said central office by a second pair of conductors, said ringing signal responsive means being connected to said second pair when said telephone set is on-hook, said means including:
  (a) means responsive to said signals on said second pair for detecting said ringing signal and generating a signal when said ringing is detected, and
  (b) means responsive to said ringing detected signal for generating said alerting signal.

22. The system of claim 21 wherein said interface means further includes switching means for connecting and disconnecting said ringing signal responsive means from said first pair of conductors, said ringing signal responsive means ordinarily being disconnected from said first pair, said ringing signal responsive means further including means responsive to said ringing detected signals for generating a control signal to said switching means, said switching means responsive to said control signal for connecting said alerting signal generating means to said first pair.

23. The system of claim 20 wherein said means responsive to said non-reactive impedances includes:
  (a) means for generating a unique signal having a predetermined amplitude associated with a respective one of said unique non-reactive impedances; and
  (b) means responsive to said unique signals for generating said central office dialing interpretable signals.

24. A telephone set for use in a system providing service between a subscriber and a central office, said system having at least one interface means electrically connected between said central office and said telephone set, said interface means receiving electrical information carrying signals and ringing signals from said central office, said information carrying signals being received when said telephone set is off-hook and said ringing signals being received when said telephone set is on-hook and electrical signals from said telephone set when said telephone set is off-hook, said telephone set comprising:
  (a) receiver means for converting electrical signals to acoustical signals;
  (b) transmitter means for converting acoustical signals to electrical signals;
  (c) switch means having one position when said telephone set is on-hook and another position when said telephone set is off-hook, each of said switch means positions providing said telephone set with a predetermined electrical characteristic; and
  (d) information entering means providing a multiplicity of unique impedances which are only non-reactive for said telephone set, each associated with the entry by said subscriber when said telephone set is off-hook of a respective one of a multiplicity of discrete pieces of information;
  said interface means including means responsive to said ringing signal for generating an alerting signal and means responsive to said unique non-reactive impedances in combination with said off-hook electrical characteristic for generating central office interpretable dialing signals
  said interface means transmitting:
    (i) to said central office said dialing interpretable signals, and
    (ii) to said telephone set said information signals and said alerting signal, said telephone set responsive to said alerting signal for alerting said subscriber.

25. The telephone set of claim 24 wherein said information entering means includes a multiplicity of dialing means and means responsive to the operation of a respective one of said dialing means by said subscriber when said telephone set is off-hook for providing said associated one of said multiplicity of said unique non-reactive impedances.

26. The telephone set of claim 25 wherein said multiplicity of dialing means includes a keyboard having a multiplicity of key means each of said key means when unoperated being an open circuit and when operated a short circuit and said unique non-reactive impedances providing means includes an array of a multiplicity of impedance means each of said impedance means being associated with a respective one of said key means, said impedance means providing said unique non-reactive impedance when said key means is operated.

27. An information entering means for use in the telephone set of a system providing service between a subscriber and a central office said system having an interface means electrically connected between said telephone set and said central office, said telephone set having receiver means for converting electrical signals to acoustical signals, transmitter means for converting acoustical signals to electrical signals and switch means having one position when said telephone set is on-hook and another position when said telephone set is off-hook, each of said switch means positions providing said telephone set with a predetermined electrical characteristic,
  said interface means receiving electrical information carrying signals and ringing signals from said central office, said information carrying signals being received when said telephone set is off-hook and said ringing signals being received when said telephone set is on-hook, and electrical signals from said telephone set when said telephone set is off-hook, said interface means including means responsive to said ringing signal for generating an alerting signal, said interface means transmitting to said central office dialing interpretable signals, and to said telephone set said information signals and said alerting signal, said telephone set responsive to said alerting signal for alerting said subscriber, said information entering means comprising:

(a) a multiplicity of dialing means, and (b) means responsive to the operation of a respective one of said dialing means by said subscriber when said telephone set is off-hook for providing an associated one of a multiplicity of unique impedances which are only non-reactive for said telephone set, said interface means responsive to said unique non-reactive impedances in combination with said off-hook electrical characteristic for generating said central office interpretable dialing signals.

28. A system for providing service between a subscriber and a central office comprising:

(a) at least one telephone set adapted for use in said system, said telephone set having at least information entering means, receiver means for converting electrical signals to acoustical signals, transmitter means for converting acoustical signals to electrical signals and switch means, (i) said switch means having one position when said telephone set is on-hook and another position when said telephone set is off-hook each of said switch means positions providing said telephone set with a predetermined electrical characteristic, (ii) said information entering means providing a multiplicity of unique electrical characteristics for said telephone set, each associated with the entry by said subscriber when said telephone set is off-hook of a respective one of a multiplicity of discrete pieces of information; and (b) at least one interface means electrically connected between said central office and said telephone, said interface means receiving:

(i) electrical information carrying signals and ringing signals from said central office, said information carrying signals being received when said telephone set is off-hook and said ringing signals being received when said telephone set is on-hook, and (ii) electrical signals from said telephone set when said telephone set is off-hook, said interface means including means responsive to said ringing signal for generating an alerting signal and means responsive to said unique electrical characteristics in combination with said off-hook electrical characteristic for generating central office interpretable dialing signals said interface means transmitting:

(i) to said central office said dialing interpretable signals, and (ii) to said telephone set said information signals and said alerting signal, said telephone set responsive to said alerting signal for alerting said subscriber said subscriber having station wiring having at least four conductors, two of said conductors being used to connect telephone sets capable of being directly connected to said central office which are located at said subscriber directly to said central office and said interface means being electrically connected to said central office by said two directly connecting conductors and electrically connected to said adapted telephone set by two of said conductors which are not said directly connecting conductors.

29. A system for providing service between a subscriber and a central office comprising:

(a) at least one telephone set adapted for use in said system, said telephone set having at least information entering means, receiver means for converting electrical signals to acoustical signals, transmitter means for converting acoustical signals to electrical signals and switch means, (i) said switch means having one position when said telephone set is on-hook and another position when said telephone set is off-hook, each of said switch means positions providing said telephone set with a predetermined electrical characteristic, (ii) said information entering means having a multiplicity of dialing means and responsive to the operation of a respective one of said dialing means by said subscriber when said telephone set is off-hook for providing an associated one of a multiplicity of unique electrical characteristics for said telephone set; and (b) at least one interface means electrically connected between said central office and said telephone set, said interface means receiving:

(i) electrical information carrying signals and ringing signals from said central office, said information carrying signals being received when said telephone set is off-hook and said ringing signals being received when said telephone set is on-hook, and (ii) electrical signals from said telephone set when said telephone set is off-hook, said interface means including means responsive to said ringing signal for generating an alerting signal and means responsive to said unique electrical characteristics in combination with said off-hook electrical characteristic for generating central office interpretable dialing signals said interface means transmitting:

(i) to said central office said dialing interpretable signals, and (ii) to said telephone set said information signals and said alerting signal, said telephone set responsive to said alerting signal for alerting said subscriber, said subscriber having station wiring having at least four conductors, two of said conductors being used to connect telephone sets capable of being directly connected to said central office which are located at said subscriber directly to said central office and said interface means being electrically connected to said central office by said two directly connecting conductors and electrically connected to said adapted telephone set by two of said conductors which are not said directly connecting conductors.

* * * * *